United States Patent [19]
Mizoshita et al.

[11] Patent Number: 5,793,560
[45] Date of Patent: Aug. 11, 1998

[54] STORAGE DEVICE HAVING VIBRATORY HEAD

[75] Inventors: Yoshifumi Mizoshita; Hiroshi Maeda; Takao Koshikawa; Takayuki Yamamoto, all of Kawasaki, Japan

[73] Assignee: Fujitsu Limited, Kanagawa, Japan

[21] Appl. No.: 358,402

[22] Filed: Dec. 19, 1994

Related U.S. Application Data

[62] Division of Ser. No. 945,455, Sep. 16, 1992, Pat. No. 5,400,192.

[30] Foreign Application Priority Data

| Sep. 18, 1991 | [JP] | Japan | 3-238439 |
| May 27, 1992 | [JP] | Japan | 4-135255 |
| Jun. 2, 1992 | [JP] | Japan | 4-141563 |
| Jun. 4, 1992 | [JP] | Japan | 4-144533 |

[51] Int. Cl.⁶ ............................ G11B 21/02
[52] U.S. Cl. ............... 360/78.12; 360/75; 360/101
[58] Field of Search ............... 360/52, 70, 69, 360/75, 78.12, 86, 101, 106, 107, 78.05, 71, 73.03, 2, 77.17

[56] References Cited

U.S. PATENT DOCUMENTS

| 4,636,893 | 1/1987 | McClure . | |
| 4,779,145 | 10/1988 | Lemelson . | |
| 5,121,280 | 6/1992 | King | 360/73.03 X |
| 5,144,581 | 9/1992 | Toda et al. | 360/78.12 X |
| 5,172,282 | 12/1992 | Chose . | |
| 5,189,578 | 2/1993 | Mori et al. | 360/106 |
| 5,212,680 | 5/1993 | Toupin . | |
| 5,303,105 | 4/1994 | Jorgenson | 360/106 |
| 5,307,311 | 4/1994 | Sliwa, Jr. | 365/174 |

FOREIGN PATENT DOCUMENTS

| A-0 442 213 | 8/1991 | European Pat. Off. . | |
| 51-79327 | 7/1976 | Japan . | |
| 51-111321 | 10/1976 | Japan . | |
| 54-92207 | 7/1979 | Japan . | |
| 59-3708 | 1/1984 | Japan . | |
| 60-57577 | 4/1985 | Japan . | |
| 60-76063 | 4/1985 | Japan . | |
| 62-89280 | 4/1987 | Japan . | |
| 62-146426 | 6/1987 | Japan | 360/78.12 |
| 2-263369 | 10/1990 | Japan . | |
| 3-69072 | 3/1991 | Japan . | |

*Primary Examiner*—Aristotelis M. Psitos
*Assistant Examiner*—James L Habermehl
*Attorney, Agent, or Firm*—Nikaido Marmelstein Murray & Oram LLP

[57] ABSTRACT

A storage device includes a substrate, a magnetic storage medium provided on the substrate, information being magnetically stored in the magnetic storage medium, a head unit, and a reciprocating mechanism provided on the substrate, the reciprocating mechanism causing the head unit to reciprocate in a plane parallel to a surface of the magnetic storage medium, wherein, while the head unit is being moved by the reciprocating mechanism, information is recorded in or reproduced from the magnetic storage medium via the head unit.

11 Claims, 33 Drawing Sheets

F I G. 1
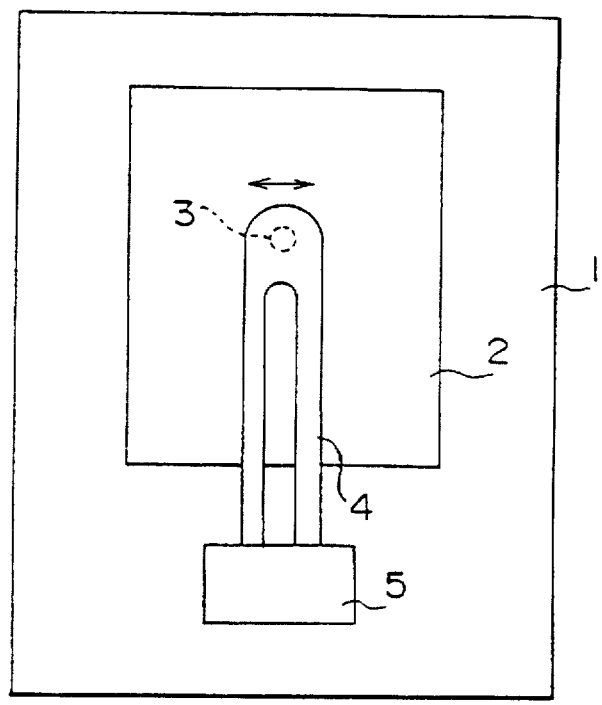
F I G. 2
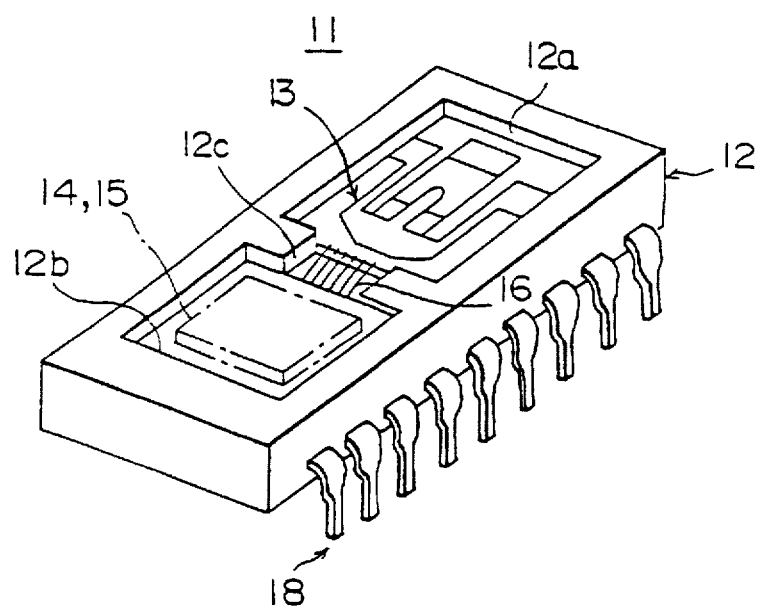

FIG. 4
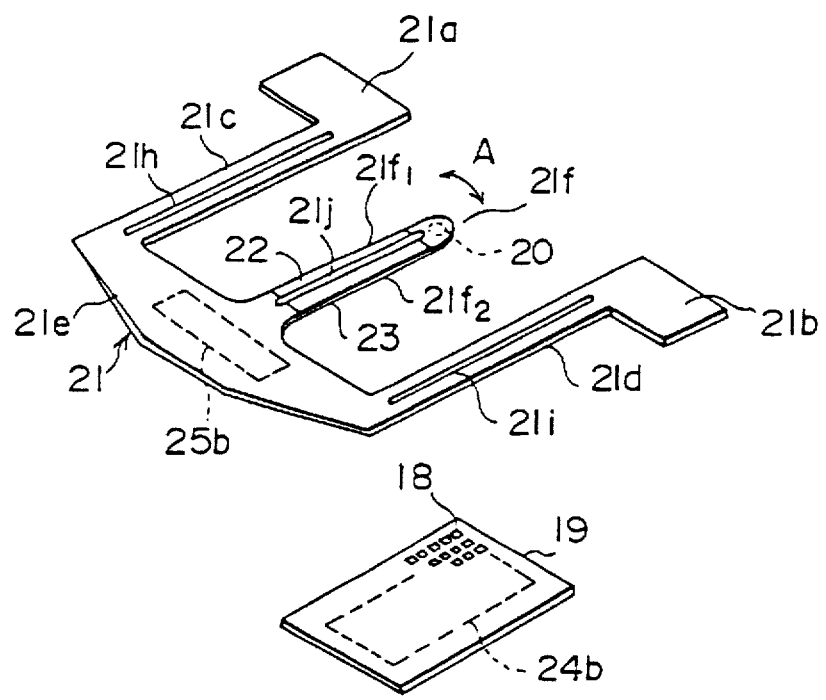
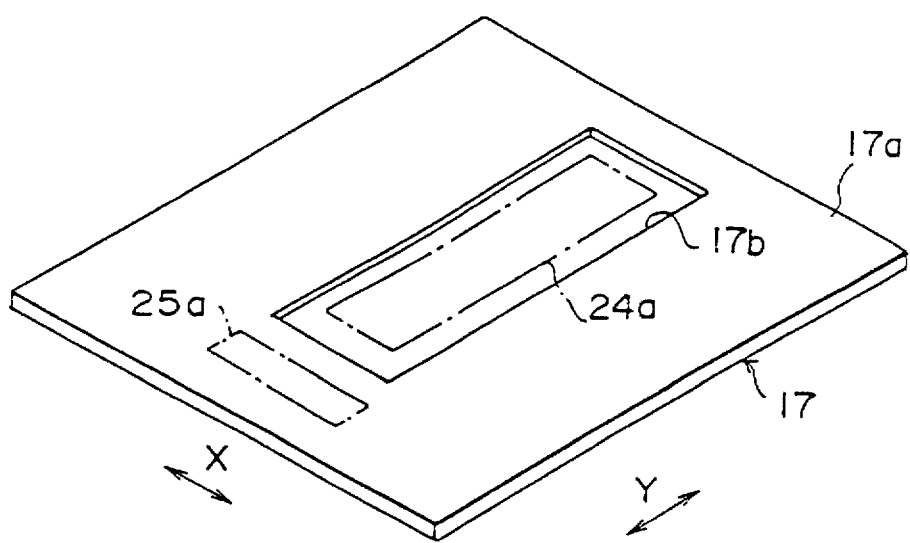

F I G. 10
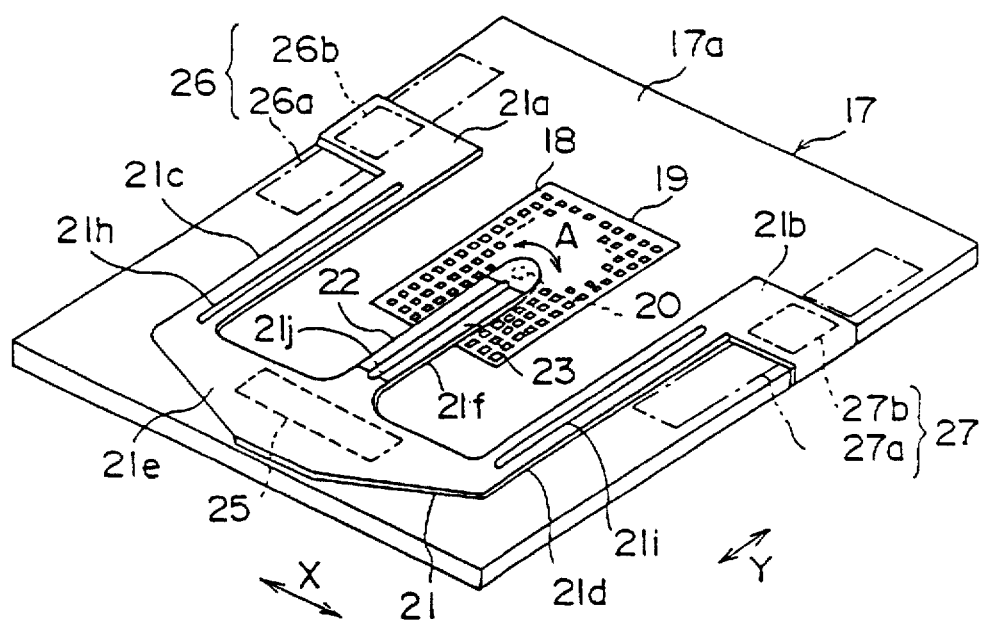

F I G. 12
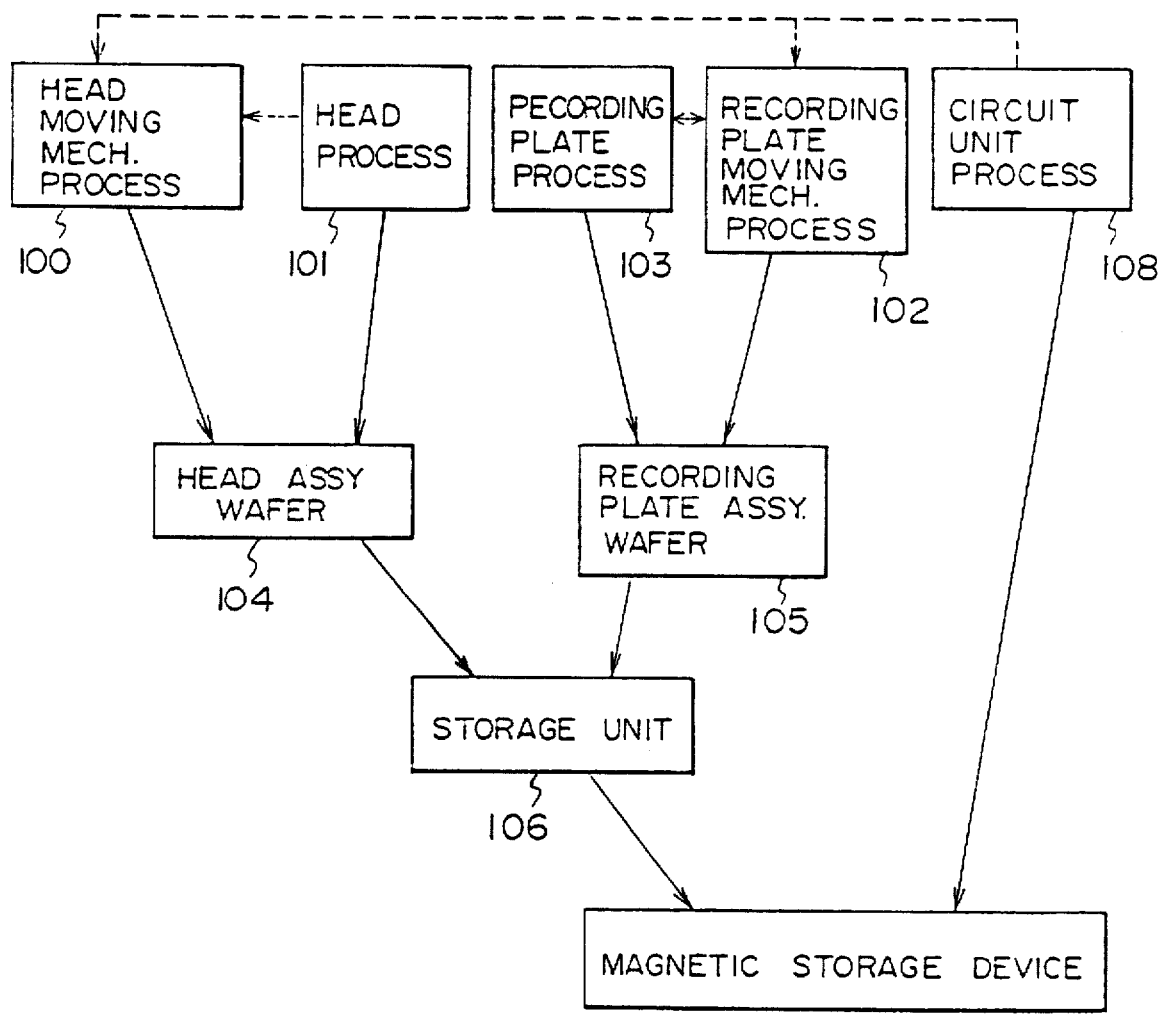

SYNCHRO.
SIGNAL

PIEZO
DRIVING
SIGNAL

MOTOR
DRIVING
SIGNAL

MAGNETIC
HEAD 227

MAGNETIC
HEAD 222

GOING STAGE

RETURNING STAGE

STORAGE DEVICE HAVING VIBRATORY HEAD

This is a division of application Ser. No. 07/945,455 filed Sep. 16, 1992, now U.S. Pat. No. 5,400,192 issued Mar. 21, 1995.

BACKGROUND OF THE INVENTION

(1) Field of the Invention

The present invention generally relates to a storage device such as a magnetic storage device, and more particularly to a recording device in which information is recorded on or reproduced from a recording medium via a vibratory head.

(2) Description of Related Art

Conventionally, storage devices such as magnetic storage devices are used as external storages of a computer system. In a conventional magnetic disk unit which is one of the magnetic storage devices, a magnetic disk is rotated at a predetermined speed and a magnetic recording head is moved in a radial direction of the magnetic disk. In this state, information is magnetically recorded to and read from the magnetic disk via the recording head.

It is necessary for the conventional magnetic disk unit to provide a motor for rotating the magnetic disk, a rotation drive mechanism such as a spindle, a mechanism for causing the magnetic recording head to hover above the magnetic disk being rotated at a high speed, a head actuator for positioning the magnetic recording head at a track on the magnetic recording disk and other complex mechanisms each having a high accuracy. Thus, as the conventional magnetic disk unit has to be provided with many parts, it is difficult to microminiaturize the magnetic disk unit under a condition in which information can be recorded at a high density.

SUMMARY OF THE INVENTION

Accordingly, a general object of the present invention is to provide a novel and useful recording device in which the disadvantages of the aforementioned prior art are eliminated.

A more specific object of the present invention is to provide a storage device in which microminiaturization thereof can be performed by a micro-mechanics technique using semiconductor processes.

Another object of the present invention is to provide a storage device in which information can be recorded at a high density.

The above objects of the present invention are achieved by a storage device comprising: a substrate; a magnetic storage medium provided on the substrate, information being magnetically stored in the magnetic storage medium; a head unit; and a reciprocating or vibration mechanism provided on the substrate, the reciprocating mechanism causing the head unit to reciprocate in a plane parallel to a surface of the magnetic storage medium, wherein, while the head unit is being moved by the reciprocating mechanism, information is recorded in or reproduced from the magnetic storage medium via the head unit.

According to the present invention, both the magnetic storage medium and the reciprocating mechanism are provided on one substrate, and information is read out from or written on the magnetic storage medium by only the reciprocating motion of the head unit. Thus, the microminiaturization of the storage device can be performed. In addition, a mechanism positioning the head unit at a position on the magnetic storage medium can be simplified, and information can be stored in the magnetic storage medium via the head unit with a high density.

Additional objects, features and advantages of the present invention will become apparent from the following detailed description when read in conjunction with the accompanying drawings.

BRIEF DESCRIPTION OF THE DRAWINGS

FIG. 1 is a diagram illustrating a principle of a first embodiment of the present invention.

FIG. 2 is a perspective view illustrating a magnetic storage device according to the first embodiment of the present invention.

FIG. 4 is an exploded perspective view illustrating the storage unit shown in FIG. 3.

FIG. 10 is a diagram illustrating a first modification of the first embodiment of the storage unit.

FIG. 12 is a block diagram illustrating processes for making the magnetic storage device.

DESCRIPTION OF THE PREFERRED EMBODIMENTS

Figure 3:
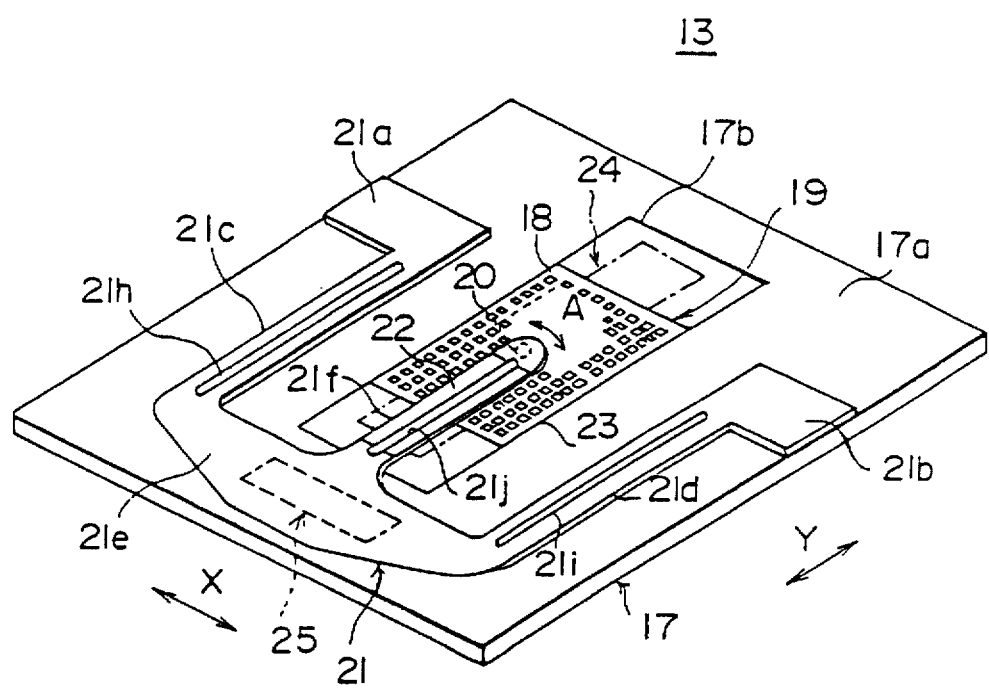
FIG. 3 is a perspective view illustrating a storage unit provided in the magnetic storage device.

A description will now be given of the principle of a first embodiment of the present invention with reference to FIG. 1.

FIG. 1 shows an essential structure of a magnetic storage device according to the first embodiment of the present invention. Referring to FIG. 1, a magnetic recording medium 2 is mounted on a substrate 1. A supporting arm 4 is mounted on the substrate 1 via a drive unit 5. A magnetic head 3 is supported at a tip end of the supporting arm 4 so as to face the magnetic recording medium 2. The drive unit 5 drives the supporting arm 4 so that the magnetic head 3 is caused to vibrate with a predetermined amplitude in directions parallel to a surface of the magnetic recording medium 2.

In the magnetic storage device described above, the magnetic head 3 is vibrated in the directions parallel to the surface of the magnetic recording medium 2 by the drive unit 5, so that the magnetic head 3 is moved relatively to the magnetic recording medium 2. While the magnetic head is being moved relatively to the magnetic recording medium 2, information is magnetically recorded on and reproduced from the magnetic recording medium 2 via the magnetic head 3. That is, the information can be record to and read from the magnetic recording medium without rotating the magnetic recording medium 2.

A description will now be given of the first embodiment of the present invention with reference to the figures.

FIG. 2 shows an example appearance of the magnetic storage device according to the first embodiment of the present invention.

Referring to FIG. 2, a magnetic storage device 11 has a storage unit 13. The storage unit 13 is housed in a first concave portion 12a of a case 12 formed of plastic. The magnetic storage device also has a circuit unit including a drive control circuit 14 for controlling the storage unit 13 and a signal processing circuit 15 for processing signals such as read signals and write signals. The circuit unit (14 and 15) is mounted in a second concave portion 12b of the case 12. A groove 12c is formed on the case 12 so that the concave portions 12a and 12b communicate with each other via the groove 12c. Terminals in the circuit unit (14 and 15) and terminals in the storage unit 13 are connected to each other by wires 16 passing through the groove 12c. The concave portions 12a and 12b and the groove 12c are covered by a lid (not shown) so that the circuit unit (14 and 15) and the storage unit 13 are magnetically and electrically shielded. A plurality of pins 18 project from side surfaces of the case 12. Predetermined terminals of the circuit unit (14 and 15) and pins 18 are connected to each other by wires in the case 12.

The magnetic storage device 11 can be directly mounted on a printed circuit board by inserting the pins 18 into holes formed on printed circuits.

The case 12 has almost the same size as a case of a normal DRAM (Dynamic Random Access Memory), or is slightly larger than the size of the case of the normal DRAM.

Figure 5:
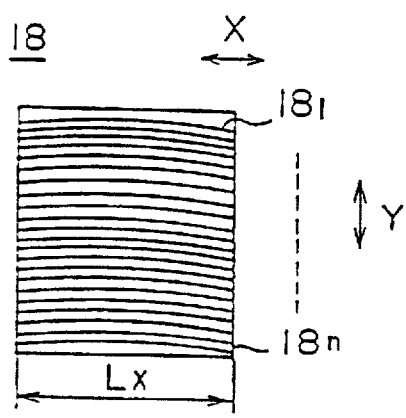
FIG. 5 is a diagram illustrating recording tracks formed on each of data cells.

The storage unit 13 is formed as shown in FIGS. 3 and 4. Referring to FIGS. 3 and 4, the storage unit 13 is formed of a substrate 17, a magnetic recording plate 19 and a head supporting member 21. The substrate 17 is made, for example, of ceramic or silicon. A length of the substrate 17 in an X-direction is approximately 10 mm, a length of the substrate 17 in a Y-direction is approximately 12 mm, and a thickness of the substrate 17 is approximately 2 mm. A rectangular concave portion 17b is formed in the middle of a surface 17a of the substrate 17. The longitudinal sides of the rectangular concave portion 17b are parallel to a Y-direction, and the width sides of the rectangular concave portion 17b are parallel to an X-direction. The magnetic recording plate 19 is engaged with the rectangular concave portion 17b of the substrate 17 so that it can slide in the Y-direction being guided by the longitudinal sides of the rectangular concave portion 17b. The magnetic recording plate 19 is formed of a plate and a plurality of rectangular areas coated by respective magnetic films. The rectangular areas are referred to as data cells 18. The data cells 18 are arranged on the surface of the magnetic recording plate 19 in a matrix (e.g. 9 columns and 14 rows). A plurality of recording tracks $18_1, \ldots,$ and $18_n$ are formed at predetermined intervals on each of the data cells 18, as shown in FIG. 5. The recording tracks $18_1$–$18n$ are arranged in the Y-direction under a condition in which the magnetic recording plate 19 is engaged with the rectangular concave portion 17b of the substrate 17. Each of the recording tracks $18_1$–$18_n$ is shaped so as to be a circular arc.

A fixed comb electrode 24a is formed on a bottom surface of the rectangular concave portion 17b of the substrate 17. A moving comb electrode 24b is formed on a rear surface of the magnetic recording plate 19. When the magnetic recording plate 19 is engaged with the rectangular concave portion 17b, the moving comb electrode 24b and the fixed comb electrode 24a face each other and are formed into a y-stage electrostatic actuator 24 (having a thin-film structure). Each of the fixed and moving comb electrodes 24a and 24b has fine structural electrode elements formed by a sputtering process or an etching process so as to be arranged at intervals equal to or less than those at which the recording tracks $18_1$–$18_n$ are arranged in each of the data cells 18. A detailed structure of the electrostatic actuator is discussed, for example, in Japanese Patent Application No. 2-099694 (corresponding PCT application JP91/00497).

When a driving voltage is applied across the fixed and moving comb electrodes 24a and 24b, an electrostatic force is generated in the Y-direction between the fixed and moving comb electrodes 24a and 24b. Due to the electrostatic force in the Y-direction, the magnetic recording plate 19 slides on the substrate 17 in the Y-direction, being guided by the longitudinal sides of the rectangular concave portion 17b.

Figure 6:
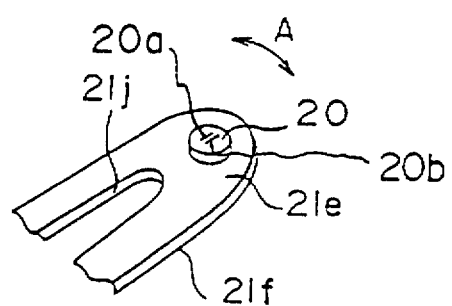
FIG. 6 is a diagram illustrating a head assembly mounted at a tip end of a head supporting arm.

The head supporting member 21 is made of, for example, ceramic or a metal plate. The head supporting member 21 is constituted of a lateral frame 21e, arms 21c and 21d and a supporting arm 21f. The arms 21c and 21d project from ends of the lateral frame 21e in a direction approximately perpendicular to the lateral frame 21e. The supporting arm 21f projects from the middle of the lateral frame 21e in a direction perpendicular to the lateral frame 21e. End plates 21a and 21b are respectively formed at ends of the arms 21a and 21b. The end plates 21a and 21b are fixed on the substrate 17 so that the arms 21c and 21d and the supporting arm 21f are parallel to the longitudinal sides of the rectangular concave portion 17b of the substrate 17 and the supporting arm 21f is located over the rectangular concave portion 17b of the substrate 17. A head assembly 20 including a magnetic head 20a and a magnetoresistance effect element 20b is mounted at an end of the supporting arm 21f as shown in FIG. 6, and the head assembly 20 can slide on the magnetic recording plate 19 engaged with the rectangular concave portion 17b of the substrate 17. The head assembly 20 may be an MR (Magnetoresistance effect) head, a thin-film head or the like. Slits 21h and 21i are respectively formed on the arms 21c and 21d so that the arms 21c and 21d can easily bend, in the X-direction, about the end plates 21a and 21b fixed on the substrate 17. A slit 21j is formed on the supporting arm 21f so that the supporting arm 21f can easily bend about the lateral frame 21e. The head assembly 20 can be also lifted up from the surface of the magnetic recording plate 19 by approximately 0.1 μm.

The supporting arm 21f is divided into a first arm $21f_1$ and a second arm $21f_2$ by the slit 21j.

Thin-film piezoelectric elements 22 and 23 are respectively mounted on surfaces of the first and second arms $21f_1$ and $21f_2$ of the supporting arm 21f by a sputtering process. Each of the piezoelectric elements 22 and 23 may be formed of piezo-ceramic, ZnO, PZT or the like. When an AC voltage is supplied to each of the piezoelectric elements 22 and 23, the piezoelectric elements 22 and 23 are repeatedly contracted and expanded in synchronism with a frequency of the applied AC voltage. Thus, when phases of the AC voltages supplied to the piezoelectric elements 22 and 23 are opposite to each other, the piezoelectric elements 22 and 23 are respectively expanded and contracted and vice versa. Thus, in this case, the first arm $21f_1$ provided with the piezoelectric element 22 and the second arm $21f_2$ provided with the piezoelectric element 23 are also respectively expanded and contracted and vice versa. As a result, when the AC voltages having phases opposite to each other are supplied to the piezoelectric elements 22 and 23, the supporting arm 21f constituted of the first and second arms $21f_1$ and $21f_2$ is vibrated in a plane parallel to the surface of the head supporting member 21. The magnitudes and frequencies of the AC voltages supplied to the piezoelectric elements 22 and 23 are set to values so that the supporting arm 21f is vibrated at a mechanical resonance frequency. In this case, the head assembly 20 mounted at the tip end of the supporting arm 21f can be vibrated in simple harmonic motion at a predetermined magnitude by use of a small amount of electric power. The magnitude of the vibration of the head assembly 20 is a predetermined stroke which is greater than a width Lx of each of the data cells 18 (see FIG. 5).

A fixed comb electrode 25a is formed on the substrate 17. A moving comb electrode 25b is formed on a rear surface of the lateral frame 21e so as to face the fixed comb electrode 25a. Each of the fixed and moving comb electrodes 25a and 25b has fine structural electrode elements formed by a fine structural technique such as a supporting process. The fixed comb electrode 25a and the moving comb electrode 25b constitute an x-stage electrostatic actuator 25 (having a thin-film structure). When a voltage is applied across the fixed comb electrode 25a and the moving comb electrode 25b, an electrostatic force is generated in the X-direction between the fixed and moving comb electrodes 25a and 25b. Due to the electrostatic force, the arms 21c and 21d are bent in the X-direction and the lateral frame 21e slides on the substrate 17 in the X-direction. That is, the head assembly 20 mounted on the supporting arm 21f is moved in the X-direction by the sliding of the lateral frame 21e. The x-stage electrostatic actuator 25 for moving the lateral frame 21e of the head supporting member 21 in the X-direction has the same structure as detailed for the y-stage electrostatic actuator 24 for moving the magnetic recording plate 19 in the Y-direction.

Figure 7:
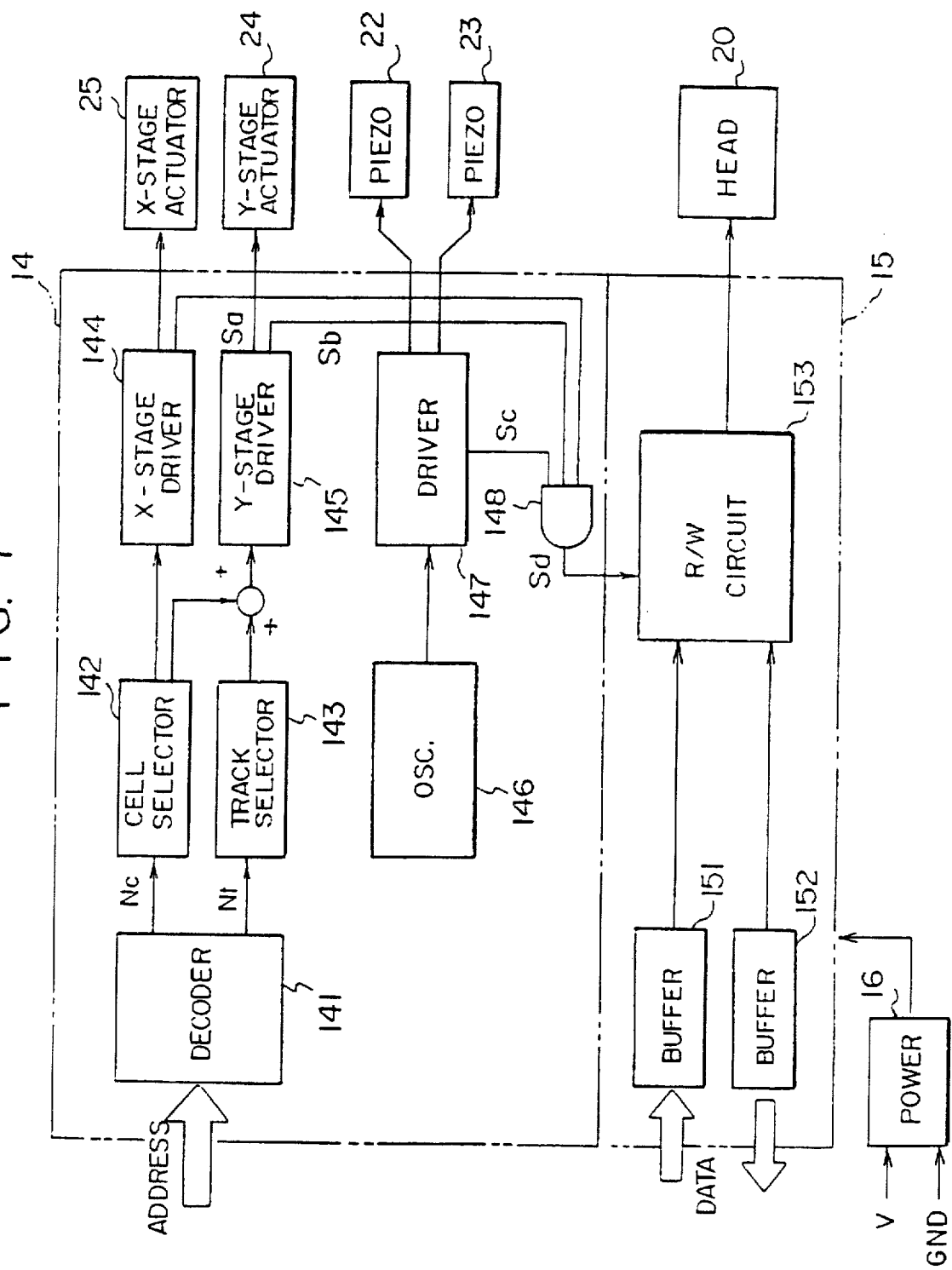
FIG. 7 is a block diagram illustrating a circuit unit of the magnetic storage device shown in FIG. 2.

The circuit unit including the drive control circuit 14 and the signal processing circuit 15 is formed as shown in FIG. 7.

Figure 8A:
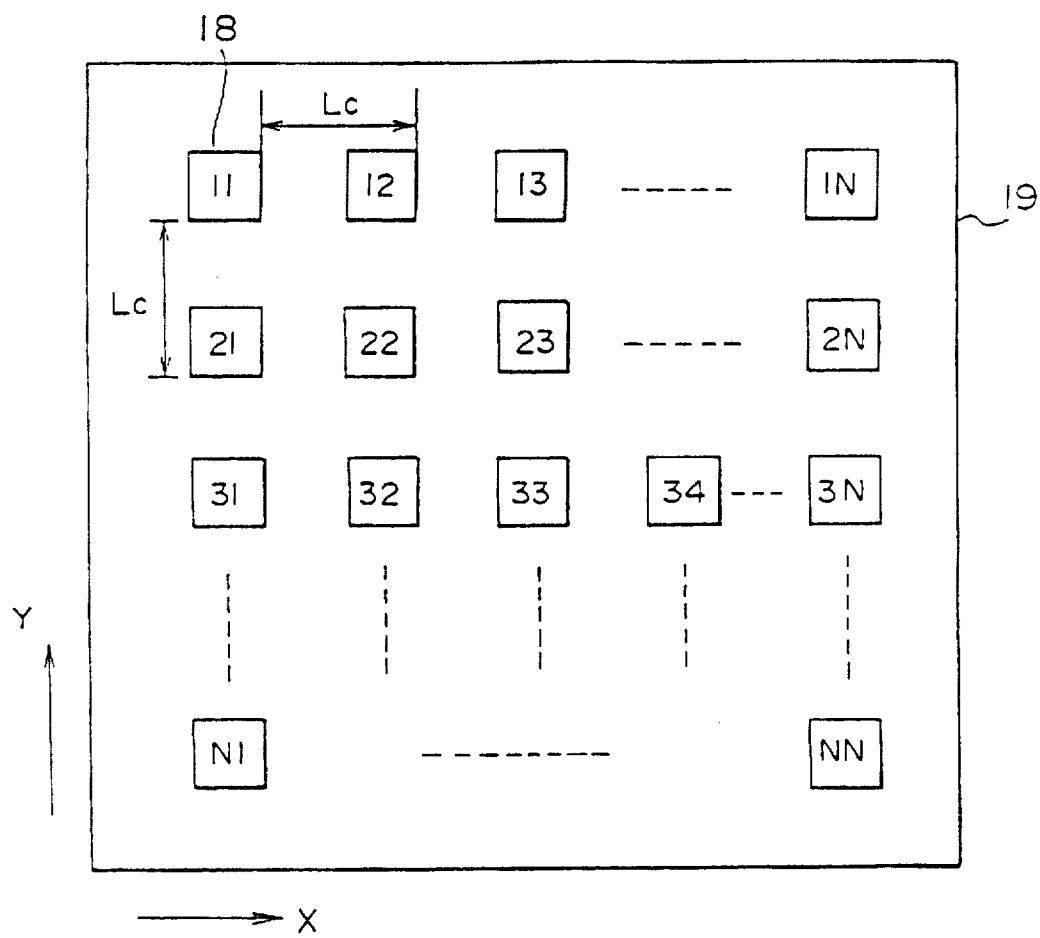
FIG. 8A is a diagram illustrating data cells arranged on the surface of a magnetic recording plate.
Figure 8B:
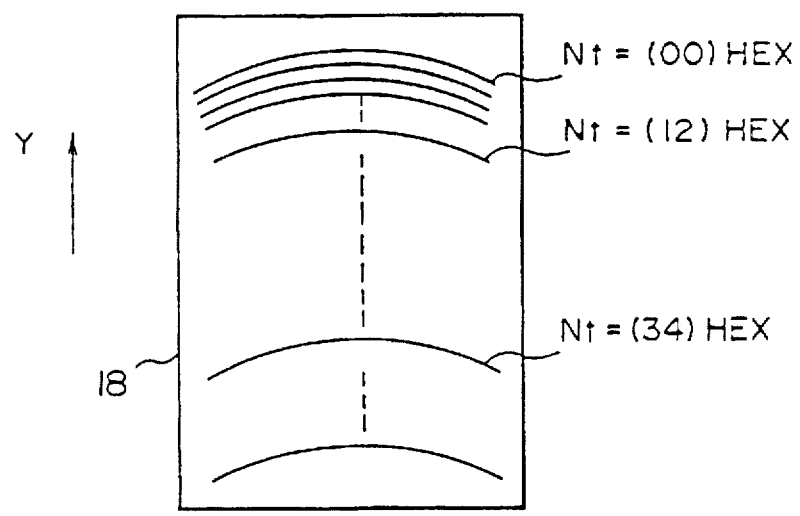
FIG. 8B is a diagram illustrating recording tracks formed on each of the data cells shown in FIG. 8A.

Referring to FIG. 7, the drive control circuit 14 has a decoder 141, a cell selector 142, a track selector 143, an x-stage driver 144 and a y-stage driver 145. The decoder 141 decodes an address of recorded data supplied from an external device (e.g. a control unit) into a data cell number $N_c$ and a track number $N_r$. The data cell number $N_c$ identifies a position of each of the data cells 18 on the magnetic recording plate 19, as shown in FIG. 8A. In FIG. 8A, the data cells 18 are arranged in an N×N matrix at intervals of Lc and the data cell number $N_c$ is denoted by $(ij)_{HEX}$, (i, j=1, 2, ..., N). The track number $N_t$ identifies a position of each of the recording tracks formed on each data cell, as shown in FIG. 8B. In FIG. 8B, the recording tracks are arranged so as to extend along the X-direction forming a column in the Y-direction and the track number $N_t$ is denoted by $(ab)_{HEX}$. The cell selector 142 calculates an x-traveling length by which the head assembly 20 should travel to the identified data cell in the X-direction and a first Y-traveling length by which the head assembly 20 should travel to the identified data cell in the Y-direction. The x-traveling length and the first Y-traveling length are calculated by using a data cell number $N_c$ supplied from the decoder 141 identifying a data cell on which the head assembly 20 should be located next, a data cell number $N_c$ indicating a data cell on which the head assembly 20 is presently located and the length (Lc) of the intervals at which the data cells 18 are arranged. The track selector 143 calculates a second Y-traveling length by which the head assembly 20 should travel to the identified recording track in the Y-direction. The second Y-direction length corresponds to the number of recording tracks between a recording track identified by the track number $N_t$ supplied from the decoder 141 and a recording track on which the the head assembly 20 is presently located.

The x-traveling length is supplied from the cell selector 142 to the x-stage driver 144. The first and second Y-traveling length are added to each other and a Y-traveling lengths obtained by addition of the first and second Y-traveling lengths is supplied to the y-stage driver 145. The x-stage driver outputs an x-driving signal having a number of pulses corresponding to the x-traveling length. The y-stage driver outputs a Y-driving signal having a number of pulses corresponding to the Y-traveling length. The x-driving signal is supplied from the x-stage driver 144 to the x-stage electrostatic actuator 25 and the Y-driving signal is supplied from the y-stage driver 145 to the y-stage electrostatic actuator 24. The x-stage electrostatic actuator 25 drives the head supporting member 21 based on the x-driving signal so that the head assembly 20 slides on the magnetic recording plate 19 in the X-direction by a distance equal to the x-traveling length. The y-stage electrostatic actuator 24 drives the magnetic recording plate 19 based on the Y-driving signal so that the magnetic recording plate 19 moves in the Y-direction by the Y-traveling length. As a result, the head assembly 20 travels to a recording track identified by the track number $N_t$ on a data cell identified by the data cell number $N_c$.

When the x-stage driver 144 and the y-stage driver 145 finish outputting the x-driving signal and the Y-driving signal respectively, the x-stage driver 144 and the y-stage driver 145 activate an x-access complete signal Sa and a y-access complete signal Sb respectively.

The drive control circuit 14 further comprises an oscillator 146 and a driver 147 for driving the piezoelectric elements 22 and 23 mounted on the supporting arm 21f. The oscillator 146 outputs an AC signal having a predetermined frequency. The driver 147 outputs two AC driving signals in synchronism with the AC signal supplied from the oscillator 146. The AC driving signals output from the driver 147 have phases opposite to each other. The AC driving signals are supplied from the driver 147 to the piezoelectric elements 22 and 23. Due to the expansion and contraction of the piezoelectric elements 22 and 23 driven by the AC driving signals, the head assembly 20 vibrates on the magnetic recording plate 19 so as to trace the recording tracks 18 thereon.

The driver 147 further outputs a read/write timing signal Sc which is activated in synchronism with the AC signal supplied from the oscillator 146. The x-access complete signal Sa, the y-access complete signal Sb and the read/write timing signal Sc are input to an AND gate circuit 148. An output signal from the AND gate circuit 148 is supplied, as a read/write enable signal, to a read/write circuit 153 of the signal processing circuit 15.

The signal processing circuit 15 has first and second buffers 151 and 152 and the read/write circuit 153. Data supplied from the external device to be recorded is temporarily stored in the first buffer 151. The read/write circuit 153 drives the head assembly 20 in accordance with the data stored in the first buffer 151 during a time for which the read/write enable signal is activated. As a result, the data is written in the specified recording track in the specified data cell on the magnetic recording plate 19. In a data read operation, the read/write circuit 153 receives read signals output from the head assembly 20 during a time for which the read/write enable signal is activated and converts the read signals into read data. The read data output from the read/write circuit 153 is temporarily stored in the second buffer 152. The read data is supplied from the second buffer 152 to the external device.

The circuit unit connected to the storage unit 13 further comprises a power circuit 16. The power circuit 16 has terminals to be connected to a power line (V) and a ground line (GND). The power circuit 16 supplies a DC voltage to the drive control circuit 14 and the signal processing circuit 15 so that the drive control circuit and the signal processing circuit 15 are activated.

Figure 9:
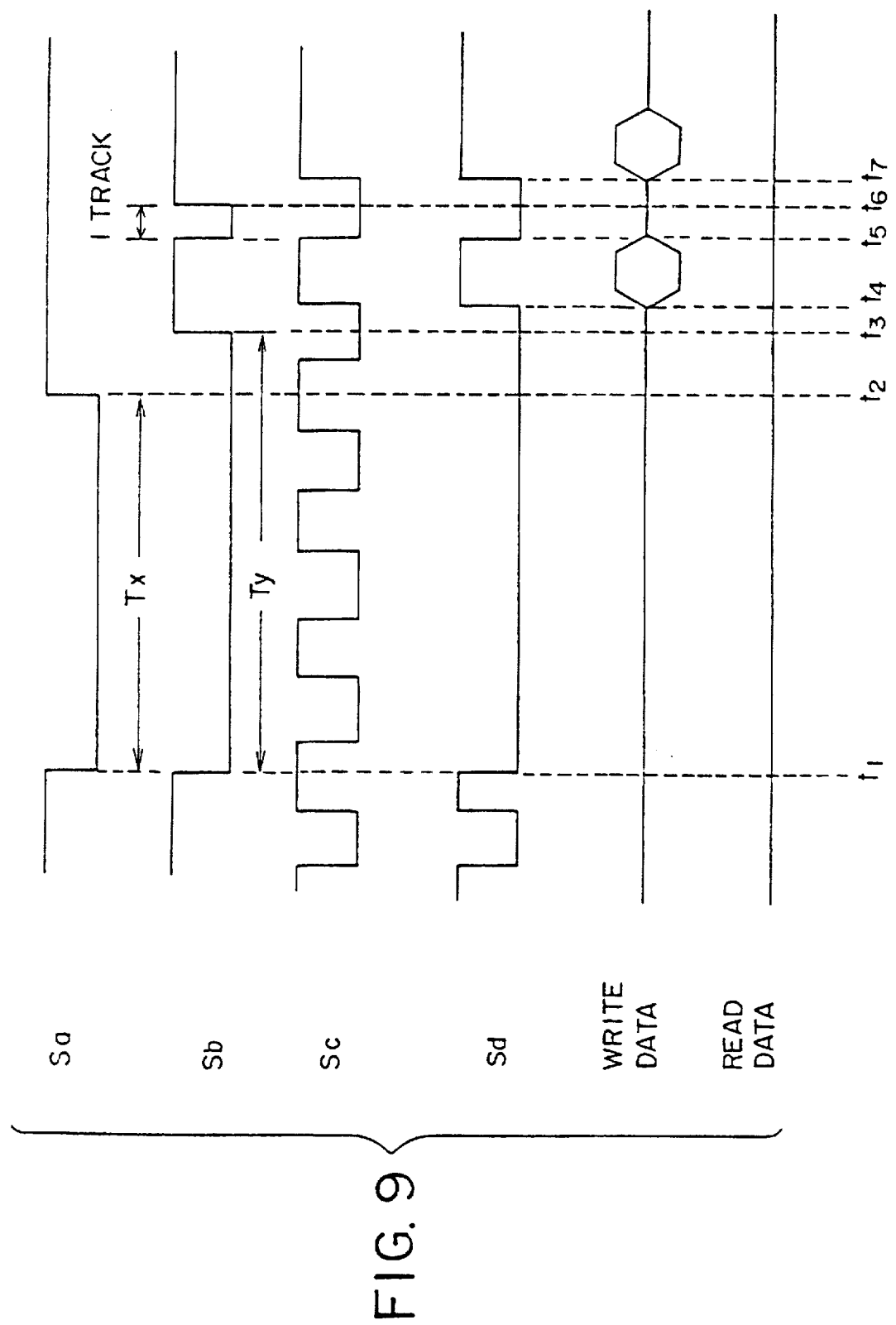
FIGS. 9A–9F are timing charts illustrating a write operation in which data is recorded on a specified data cell.

In a writing operation, the x-access complete signal Sa, the y-access complete signal Sb, the read/write timing signal Sc, the read/write enable signal and the write data vary in accordance with a timing chart shown in FIG. 9. The head assembly 20 is traveling in the X-direction for a time Tx corresponding to the x-traveling length from t1 to t2. When the traveling of the head assembly 20 by the x-traveling length is completed at t2, the x-access complete signal Sa is activated. The magnetic recording plate 19 is traveling in the Y-direction for a time Ty corresponding to the Y-traveling length from t1 to t3. When the traveling of the magnetic plate 19 by the Y-traveling length is completed at t3, the y-access complete signal Sb is activated. At this time, the head assembly 20 is located on a specified recording track in a specified data cell.

The read/write timing signal Sc varies in synchronism with the AC signal output from the oscillator 146. When the read/write timing signal Sc is activated under a condition in which both the x-access complete signal Sa and the y-access complete signal Sb are activated, the read/write enable signal Sd becomes active (t4–t5). During a time (t4–t5) for which the read/write enable signal Sd is activated, the head assembly 20 traces the specified recording track once so that write data is recorded in the specified recording track via the head assembly 20. When the writing operation with respect to a recording track is completed, the writing operation with respect to the next recording track starts. That is, the y-access complete signal Sb becomes inactive at t5, and the magnetic recording plate 19 is moved by the length of the intervals of the recording tracks in the Y-direction. In this time, the read/write enable signal Sd is inactive. When, due to the moving of the magnetic recording plate 19, the head assembly 20 is located on the next recording track at t6, the y-access complete signal Sb is activated again. Then, when, in this state, the read/write timing signal Sc is activated at t7, the read/write enable signal Sd is activated again. After the read/write enable signal Sd is activated at t7, the head assembly 20 traces the next recording track once, during that the next write data is recorded in the next recording track via the head assembly 20.

According to the first embodiment, the head assembly 20 and the magnetic recording plate 19 are respectively moved in the X-direction and the Y-direction and the head assembly 20 is vibrated in a state of simple harmonic motion so as to slide on the magnetic plate 19. The electrostatic actuators for moving the head assembly 20 and the magnetic recording plate 19 and the piezoelectric elements 22 and 23 for vibrating the head assembly 20 can be formed to be thin by using a semiconductor production process.

FIG. 10 shows a modification of the storage unit. In FIG. 10, those parts which are the same as those shown in FIGS. 3 and 4 are given the same reference numbers.

Referring to FIG. 10, the magnetic recording plate 19 is embedded in the middle of the substrate 17 so that the surface of the magnetic recording plate 19 is continuously connected to the surface of the substrate 17. The head supporting member 21 is mounted so as to be capable of moving in both the X-direction and the Y-direction. Fixed comb electrodes 26a and 27a are formed on the substrate 17 along the sides thereof. Moving comb electrodes 26b and 27b are respectively formed on rear surfaces of the end plates 21a and 21b of the head supporting member 21 so as to respectively face the fixed comb electrodes 26a and 27a. The fixed and moving comb electrodes 26a and 26b and the fixed and moving comb electrodes 27a and 27b respectively form Y-direction electrostatic actuators 26 and 27. Each of the the Y-direction electrostatic actuator 26 and 27 has the same detailed structure as for the X-direction electrostatic actuator 25.

Due to the X-direction electrostatic actuator 25 and the Y-direction electrostatic actuators 26 and 27, the supporting arm 21f on which the head assembly 20 is mounted can be moved in both the X-direction and the Y-direction. Thus, the head assembly 20 mounted on the supporting arm 21f can be located on each of the data cells 18 formed on the magnetic recording plate 19.

According to the above modification of the storage unit, the moving comb electrodes 26b, 27b and 25b can be simultaneously formed on the rear surface of the head supporting member 21 by using a semiconductor production process such as a sputtering process, and the fixed comb electrodes 26a, 27a and 25a can be also simultaneously formed on the substrate 17 by the sputtering process. Thus, the X-direction electrostatic actuator 25 and the Y-direction electrostatic actuators 26 and 27 can be effectively formed.

It is also possible to provide the storage unit in which the magnetic recording plate 19 can be moved in both the X-direction and the Y-direction. In this case, the supporting arm 21f on which the head assembly 20 is mounted is fixed on the substrate so as to be capable of vibrating in a plane parallel to the surface of the magnetic recording plate 19.

Figure 11:
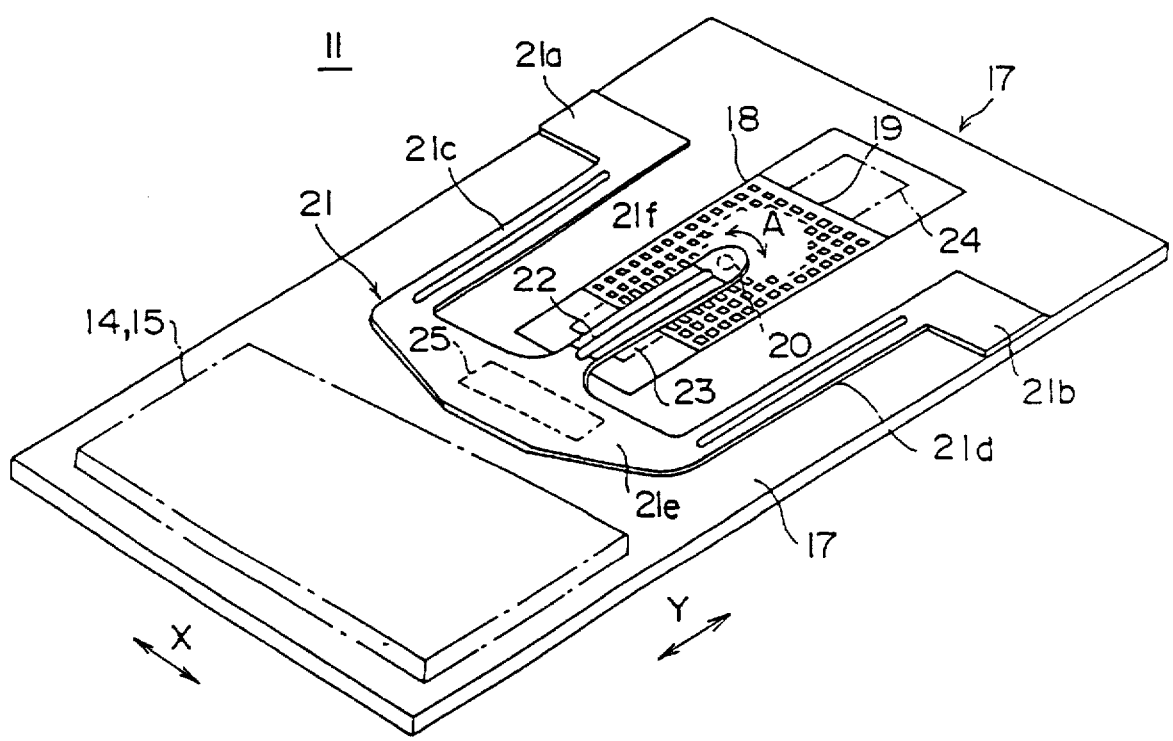
FIG. 11 is a diagram illustrating a second modification of the first embodiment of the storage unit.

FIG. 11 shows another modification of the storage unit. In FIG. 11, those parts which are the same as those shown in FIGS. 3 and 4 are given the same reference numbers. In this modification shown in FIG. 11, the circuit unit including the drive control circuit 14 and the signal processing circuit 15 is incorporated with the storage unit on the substrate 17.

According to this modification shown in FIG. 11, the magnetic storage device 11 can be further miniaturized.

A description will now be given, with reference to FIGS. 12–15B, of processes for producing the magnetic storage device.

Figure 13:
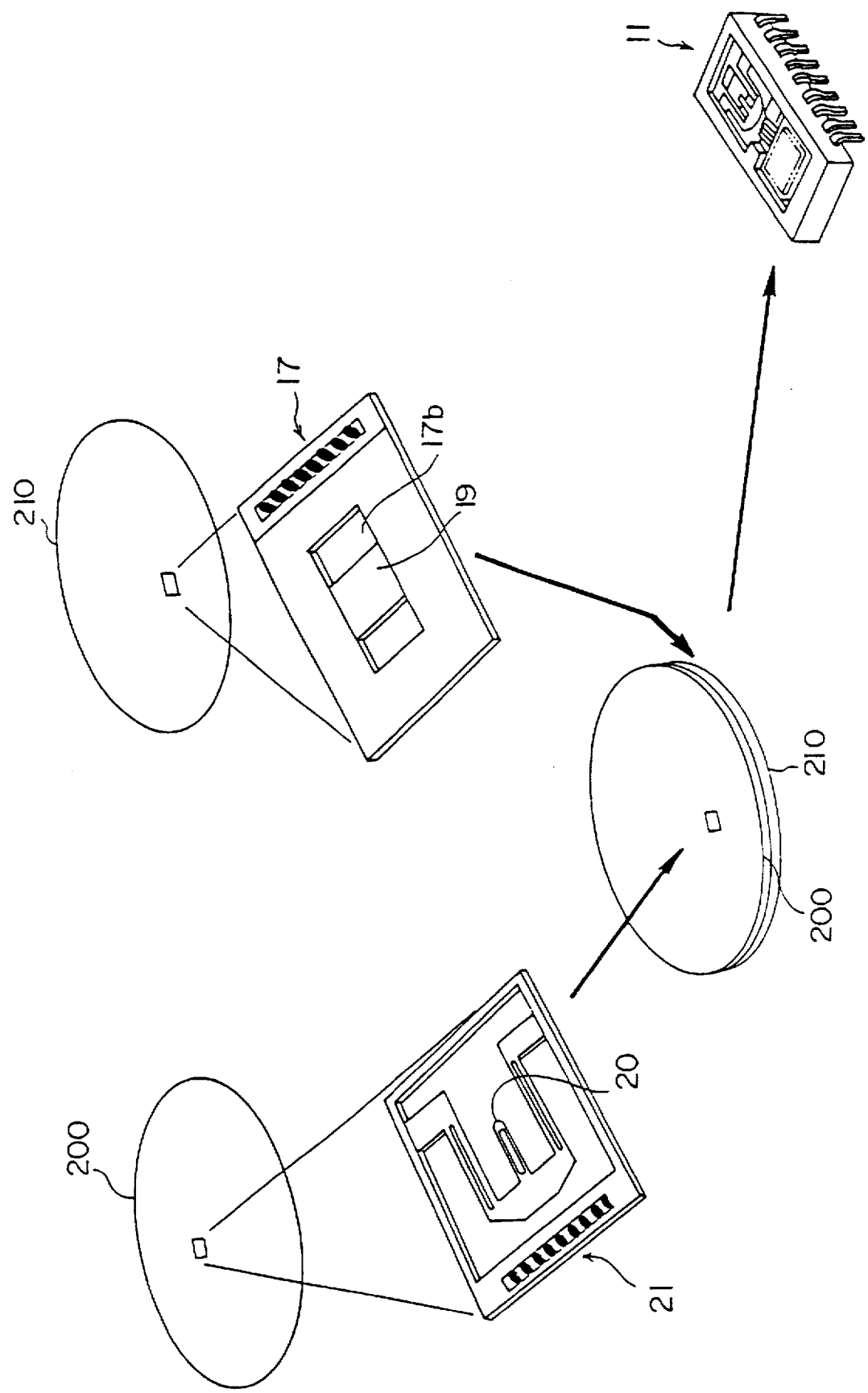
FIG. 13 is a diagram illustrating substrates formed in the processes shown in FIG. 12.
Figure 14A:
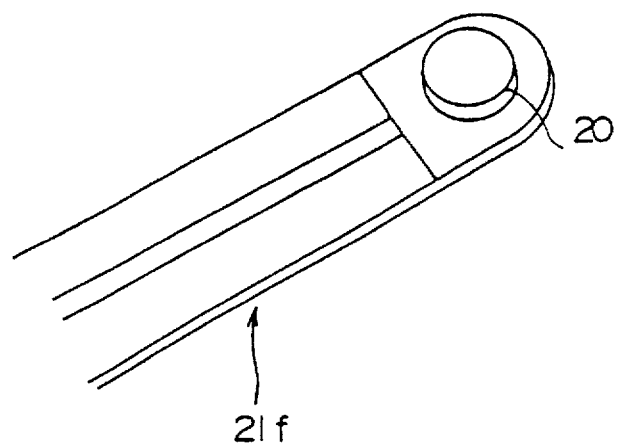
FIGS. 14A and 14B are diagrams illustrating a structure of a head supporting arm.
Figure 14B:
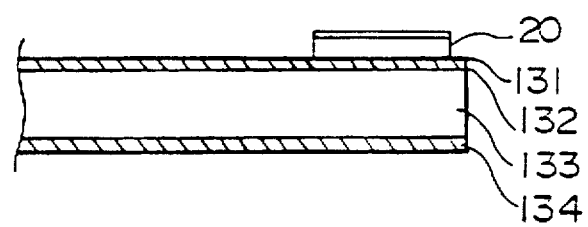

Referring to FIGS. 12 and 13, in a process 100, a plurality of chips of a head moving mechanism are formed on a silicon wafer 200 in a predetermined regular pattern by a semiconductor production process. The head moving mechanism includes the head supporting member 21, the piezoelectric elements 22 and 23 mounted on the supporting arm 21f of the head supporting member 21, the moving comb electrode 24b of the X-direction electrostatic actuator 25, and various printed lines and terminals. In a process 101, an MR (Magnetoresistance effect) element is deposited on an Al₂O₃—TiC ceramic, so that the head assembly 20 (an MR head) is made. In a process 104, the head assembly 20 is adhered to the tip end of the supporting arm 21f of the head supporting member 21, formed on the silicon wafer 200 in the process 100, by a conductive adhesive as shown in FIG. 14A. The tip end of the supporting arm 21f has a structure as shown in FIG. 14B. Referring to FIG. 14B, insulating layers 132 and 134 are formed on both surfaces of a piezoelectric layer 133. A conductive layer 131 is formed on the insulating layer 132. The head assembly 20 is adhered to the conductive layer 131 by the conductive adhesive. The silicon wafer 200 in which the head assembly 20 is adhered to each chip of the head moving mechanism is referred to as a head assembly wafer.

The head assembly 20 can be also made while each head moving mechanism is being produced in the process 100.

Figure 15A:
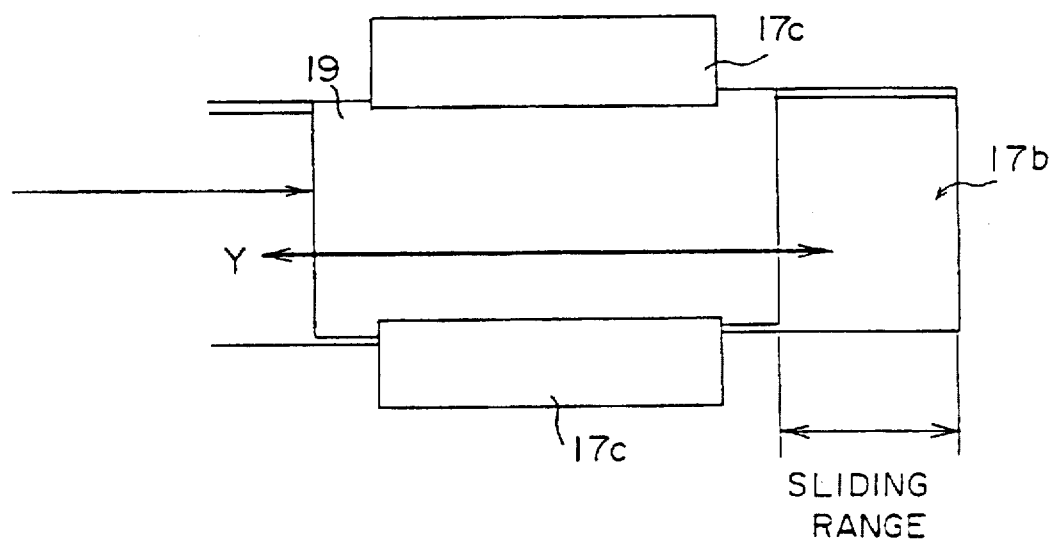
FIGS. 15A and 15B are diagrams illustrating a structure of a chip provided with a magnetic recording plate.
Figure 15B:
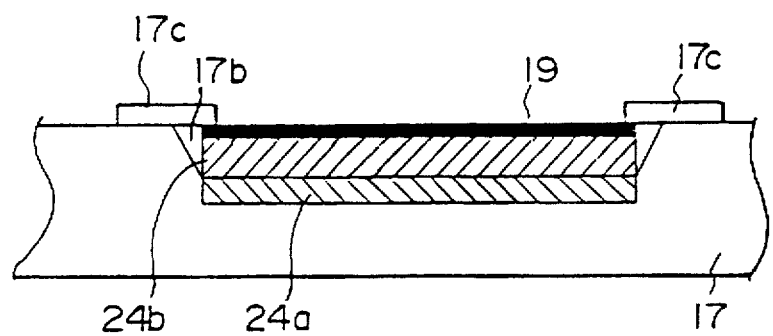

In a process 102, a plurality of chips of a recording plate moving mechanism are formed on a silicon wafer 210 in a predetermined regular pattern by a semiconductor production process. The recording plate moving mechanism includes the fixed comb electrode 24a of the Y-direction electrostatic actuator 24, various printed lines and terminals. The rectangular concave portion 17b is formed in the middle of the substrate 17, and the fixed comb electrode 24a is formed on the bottom surface of the rectangular concave portion 17b. In step 103, the magnetic recording plate 19 is made by coating magnetic films on a plate. Then the moving comb electrode 24b of the Y-direction electrostatic actuator 24 is formed on the rear surface of the magnetic recording plate 19. In a process 105, the magnetic recording plate 19 is inserted into the rectangular concave portion 17b of the substrate 17 of each chip formed on the silicon wafer 210, as shown in FIGS. 15A and 15B. Then, leaf springs 17c are formed on the substrate 17 so that edges of the leaf springs 17c slightly project into the rectangular concave portion 17b. The leaf springs 17c prevent the magnetic recording plate 19 from separating from the rectangular concave portion 17b of the substrate 17. The silicon wafer 210 in which the magnetic recording plate 19 is assembled into each chip of the recording plate moving mechanism is referred to as a recording plate assembly wafer.

In a process 106, the head assembly wafer 200 made in the process 104 and the recording plate assembly wafer 210 made in the process 105 are adhered to each other so that each of the chips of the head moving mechanism on the head assembly wafer 200 and a corresponding one of the chips of the recording plate assembly wafer 210 overlap. A fringe of each of chips on the head assembly wafer 200 and a fringe of a corresponding one of chips on the recording plate assembly wafer 210 are adhered to each other due to an adhesive. The head assembly wafer 200 and the recording plate wafer 210 can be joined by a high-temperature joint method. In addition, the head assembly wafer 200 and the recording plate wafer 210 can be also connected by a low melting point metal. In this case, a stacked structure in which the low melting point metal is put between the head assembly wafer 200 and the recording plate wafer 210 is heated at approximately 300° C. for a predetermined time. Then, the low melting point metal is melted, and the head assembly wafer 200 and the recording plate assembly wafer 210 is connected.

After the joining of the head assembly wafer 200 and the recording plate assembly wafer 210, The joined wafers are cut chip by chip by a dicing saw. Then, each of chips are encapsulated into the case 12 with the circuit unit 13, so that the magnetic storage device 11 shown in FIG. 2 is finished.

According to the above processes for producing the magnetic storage device 11, as the head assembly and recording plate assembly are separately made and then joined to each other, the storage unit 13 can be easily produced.

The above wafers may be made of ceramic (A1023-TiC ceramic) to improve rigidity thereof.

A description will now be given of a second embodiment of the present invention with reference to FIGS. 16–20.

Figure 16:
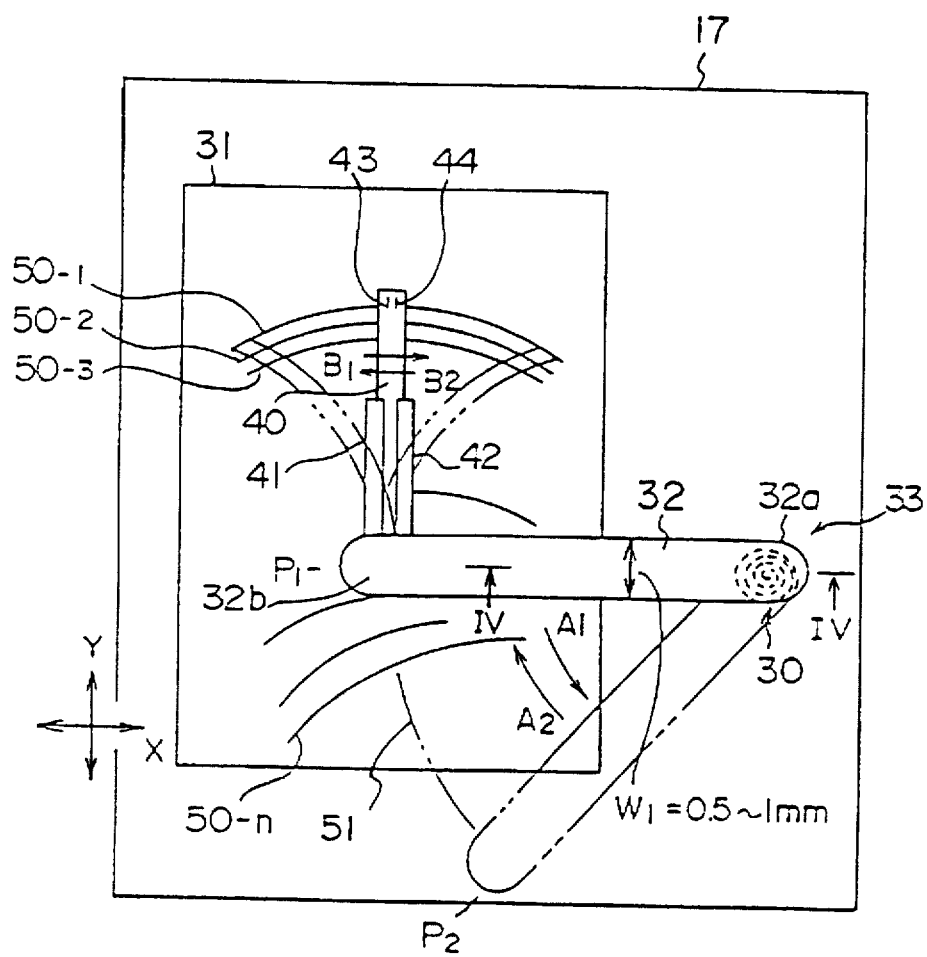
FIG. 16 is a diagram illustrating a second embodiment of the present invention.
Figure 17:
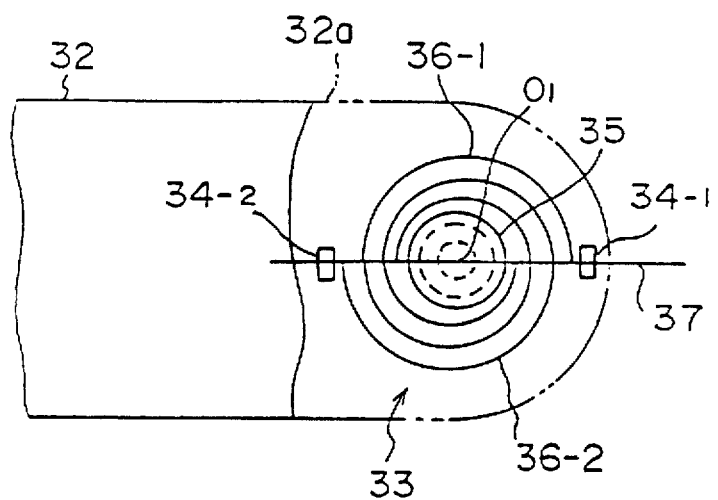
FIG. 17 is a diagram illustrating a structure of an end of an arm shown in FIG. 16.
Figure 18:
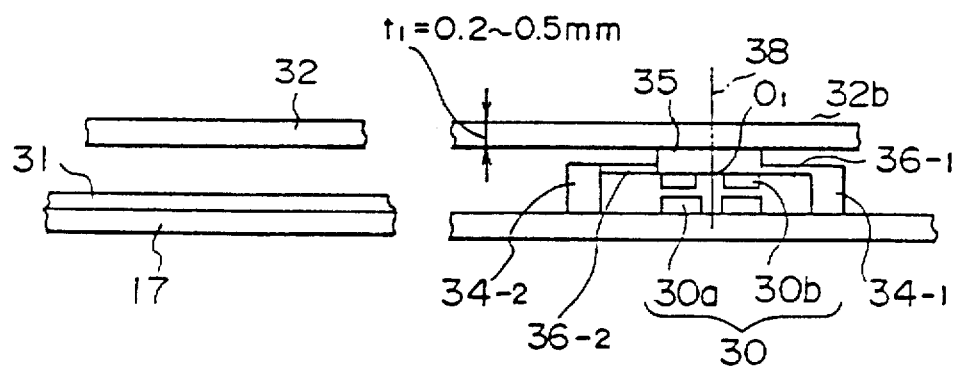
FIG. 18 is a cross sectional view taken along line IV—IV shown in FIG. 16.

FIG. 16 shows a structure of the storage unit 13. The storage unit 13 is encapsulated in the case 12 with the circuit unit as shown in FIG. 2. Referring to FIG. 16, the substrate is made of ceramic or silicon. A magnetic recording plate 31 having an area, each side being a few millimeters (mm), is mounted on the substrate 17. An arm 32 is provided on the substrate 17. The width w1 of the arm 32 is in a range of 0.5–1 mm, and the thickness t1 thereof is in a range of 0.2–0.5 mm. An end 32a of the arm 32 is rotatably supported by a joint mechanism 33 mounted on the substrate 17. The joint mechanism 33 is formed as shown in FIGS. 17 and 18. That is, the joint mechanism 33 comprises a pair of anchors $34_{-1}$ and $34_{-2}$ fixed on the substrate 17, a disk 35 formed on the rear surface of the arm 32, and a pair of power springs $36_{-1}$ and $36_{-2}$. The anchors $34_{-1}$ and $34_{-2}$ are fixed on a line 37 passing through a center O1 of the disk 35 so that the disk 35 is between the anchors $34_{-1}$ and $34_{-2}$. A first end of the power spring $36_{-1}$ is fixed on the anchor $34_{-1}$ and a second end of the power spring $36_{-1}$ is connected to a predetermined point on the fringe of the disk 35. The power spring $36_{-1}$ is wound one and a half turns in a counterclockwise direction. A first end of the other power spring $36_{-2}$ is fixed on the other anchor $34_{-2}$ and a second end of the other power spring $36_{-2}$ is connected to a predetermined point on the fringe of the disk 35. The other power spring $36_{-2}$ is also wound one and a half turns in the counterclockwise direction. Each of the power springs $36_{-1}$ and $36_{-2}$ is made of a material such as Si, $Al_2O_3$ or $SiO_2$.

The arm 32 is supported by the power springs $36_{-1}$ and $36_{-2}$. Due to the elastic deformation of the power springs $36_{-1}$ and $36_{-2}$ the arm 32 can be pivoted around a Z-axis 38, which passes through the center O1 of the disk 35 and is perpendicular to the surface of the substrate 17, within a range of approximately 45° in counterclockwise and clockwise directions $A_1$ and $A_2$. That is, the arm 32 can be pivoted on the Z-axis 38 within a range between a terminus position Pi in the clockwise direction indicated by a continuous line and a terminus position P2 in the counterclockwise direction indicated by a chain double-dashed line.

Figure 19:
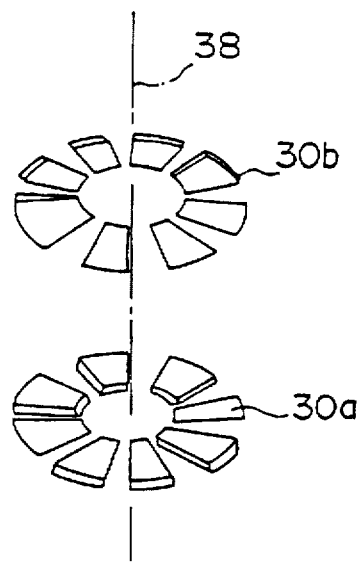
FIG. 19 is a diagram illustrating a structure of an electromagnetic driving motor shown in FIG. 18.

The joint mechanism 33 is provided with an electromagnetic driving motor 30. The electromagnetic driving motor 30 is constituted of coils 30a mounted on the surface of substrate 17 and permanent magnets 30b mounted on the surface of the disk 35 as shown in FIG. 18. The coils 30a and the permanent magnets 30b face each other and radially arranged around the Z-axis 38, as shown in FIG. 19. A driving current is supplied to the exiting coils 30a, and a rotating magnetic field is generated in a space between the exiting coils 30a and the permanent magnets 30b. Thus, due to the rotating magnetic field, torque acts on the permanent magnets 30b in the counterclockwise direction $A_1$ or the clockwise direction $A_2$. That is, the torque acts on the disk 30 mounted on the end 32b of the arm 32.

Returning to FIG. 16, a finger 40 is mounted on a tip end 32b of the arm 32 so as to extend in a direction approximately perpendicular to the arm 32. Piezoelectric elements 41 and 42 are respectively fixed on both sides of the finger 40.

Figure 20:
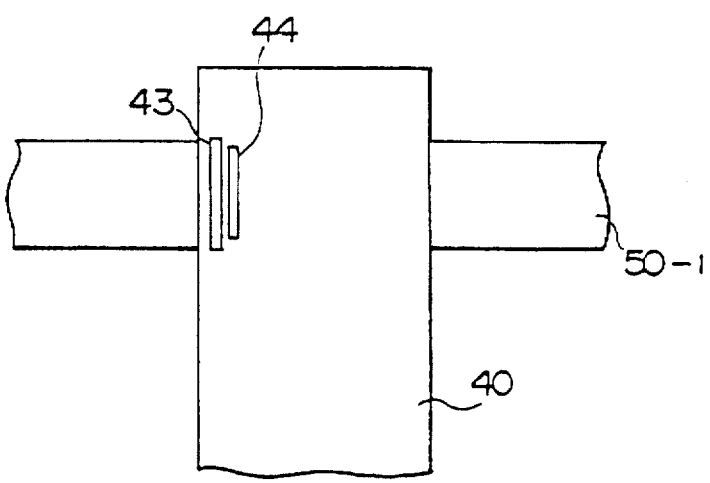
FIG. 20 is an enlarged diagram illustrating a tip end of the arm.

A thin-film structured magnetic head 43 and a thin-film structured magnetoresistance effect element 44 (an MR element 44) are mounted on the tip end of the finger 40, as shown in FIG. 20. The thin-structured magnetic head 43 is used for recording information and the MR element 44 is used for reproducing information. The piezoelectric elements 41 and 42 are expanded and contracted in respectively opposite phases, so that the finger 40 is vibrated in directions B1 and B2 as shown by chain double-dashed line in FIG. 16.

The storage unit described above operates in the following manner.

When sine wave signals whose phases differ from each other by 180° are respectively continuously supplied to the piezoelectric elements 41 and 42, the finger 40 is vibrated in a state of simple harmonic motion in the directions $B_1$ and $B_2$. When the finger is moved in the direction $B_1$, information is recorded on the recording magnetic plate 31 and each of recording tracks $50_{-1}$–$50_{-n}$ is formed on the magnetic plate 31 so as to be shaped in a circular arc. The width $W_2$ of each of the recording tracks $50_{-1}$–$50_{-n}$ is in a range of 7–8 μm. When the electromagnetic motor 30 is driven, the arm 32 is rotated around the Z-axis 38 in the counterclockwise direction $A_1$ at a constant speed. Due to the moving of the arm 32, the magnetic head 43 and the MR element 44 move on the magnetic recording plate 31 on which the recording tracks $50_{-1}$–$50_{-n}$ are formed at predetermined intervals. When the arm 32 is rotated around the Z-axis 38, the tip end of the arm 32b moves so as to trace a circular arc 51. Thus, each of the recording tracks $50_{-1}$–$50_{-n}$ and the circular arc 51 cross at an angle approximately perpendicular.

The magnetic head 43 and the MR element 44 are located on a specified recording track in the following manner.

The MR element 44 reads out information from the magnetic recording plate 31 while the finger 40 is being vibrated. A driving signal is supplied to the electromagnetic motor 30 and the arm 32 is rotated around the joint mechanism 33. When an address corresponding to the specified recording track (e.g. the recording track $50_{-1}$) is read out via the magnetic head 43, the arm 32 is stopped at a position at which the address is read out. As a result, the magnetic head 43 and the MR element 44 are located on, for example, the recording track $50_{-1}$ as shown in FIG. 20. Then, while the finger 40 is moving in the direction $B_1$, information is written on or read out from the specified recording track $50_{-1}$.

According to the second embodiment, as the joint mechanism 33 rotatably supporting the arm 32 has no bearings, there is no abrasion in the joint mechanism 33 and the durability of the storage unit is improved. In addition, due to the rotation of the arm 32, the magnetic head 43 and the MR element 44 can be moved on the magnetic recording plate 31. Thus, the magnetic head 43 and the MR element 44 can be stably moved on the magnetic recording plate 31 and accurately located on a specified recording track.

The magnetic storage device according to the second embodiment is produced by a micro-machining technology using a thin-film process.

(1) The magnetic recording plate 31;

(2) the exiting coils 30a;

(3) the anchors $34_{-1}$ and $34_{-2}$;

(4) the permanent magnets 30b;

(5) the power springs $36_{-1}$ and $36_{-2}$;

(6) the disk 35; and (7) the arm 32 are, in this order, formed on the substrate 17 made of ceramic or silicon.

A description will now be given of a modification of the second embodiment of the present invention with reference to FIG. 21.

Figure 21:
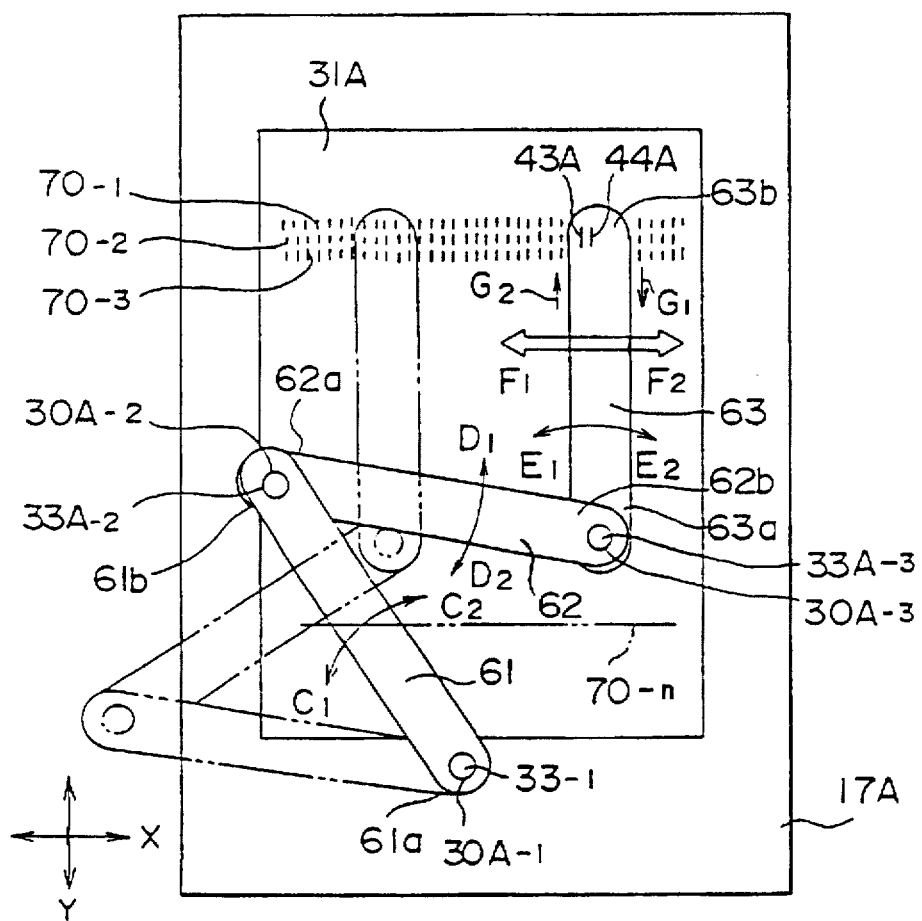
FIG. 21 is a diagram illustrating a modification of the second embodiment.

Referring to FIG. 21, a first arm 61, a second arm 62 and a third arm 63 are provided on a substrate 17A. An end 61a of the first arm 61 is rotatably supported by a joint mechanism 33A–1 mounted on the substrate 17A. The first arm 61 can be pivoted on the joint mechanism 33A–1 in directions C1 and C2. An end 62a of the second arm 62 is rotatably connected to a tip end 61b of the first arm 61 by a joint mechanism 33A–2. The second arm 62 can be pivoted on the joint mechanism 33A-2 in directions D1 and D2. An end 63a of the third arm 63 is rotatably connected to a tip end 62b of the second arm 62 by a joint mechanism 33A-3. The third arm 63 can be pivoted on the joint mechanism 33A-3 in directions E1 and E2. A magnetic head 43A and an MR element 44A (Magnetoresistance effect element) are mounted on a tip end 63b of the third arm 63 so as to face the surface of a magnetic recording plate 31A fixed on the substrate 17A. The joint mechanisms 33A-1, 33A-2 and 33A-3 are respectively provided with electromagnetic driving motors 30A-1, 30A-2 and 30A-3. Each of the electromagnetic driving motors 30A-1, 30A-2 and 30A-3 has the same structure as that shown in FIG. 19.

The first arm 61, the second arm 62 and the third arm 63 are respectively rotated in the directions C1, D1 and E1 by the joint mechanisms 33A-1, 33A-2 and 33A-3 at a predetermined speed ratio, so that the third arm 63 linearly moves in a direction F1, as shown in FIG. 21. The first arm 61, the second arm 62 and the third arm 63 are respectively rotated in the directions C2, D2 and E2 at a predetermined speed ratio, so that the third arm 63 linearly moves in a direction F2. When the second arm 62 is rotated around the joint mechanism 33A-2 in the directions D1 and D2, the third arm 63 linearly moves along directions G1 and G2.

While the third arm 63 is linearly moving in the directions F1 and F2 and the directions G1 and G2, information is written on the magnetic recording plate 31A and linear recording tracks $70_{-1}$–$70_{-n}$ are formed on the magnetic recording plate 31A at predetermined intervals. While the third arm 63 is moving in the directions F1 and F2, the magnetic head 43 and the MR element 44 trace each of the recording tracks $70_{-1}$–$70_{-1}$. While the third arm 63 is moving in the directions G1 and G2, the magnetic head 43 (44) linearly moves to cross the recording tracks $70_{-1}$–$70_{-1}$.

According to the modification of the second embodiment, as the recording track can be linearly formed on the magnetic recording plate 31A, the rectangularly shaped magnetic recording plate 31A can be effectively used. In addition, even if an off-track occurs, a phase of a reproduced signal does not vary. Thus, it is easy to process signals output from the magnetic head 43.

A description will now be given of a third embodiment of the present invention with reference to FIGS. 22–27.

Figure 22:
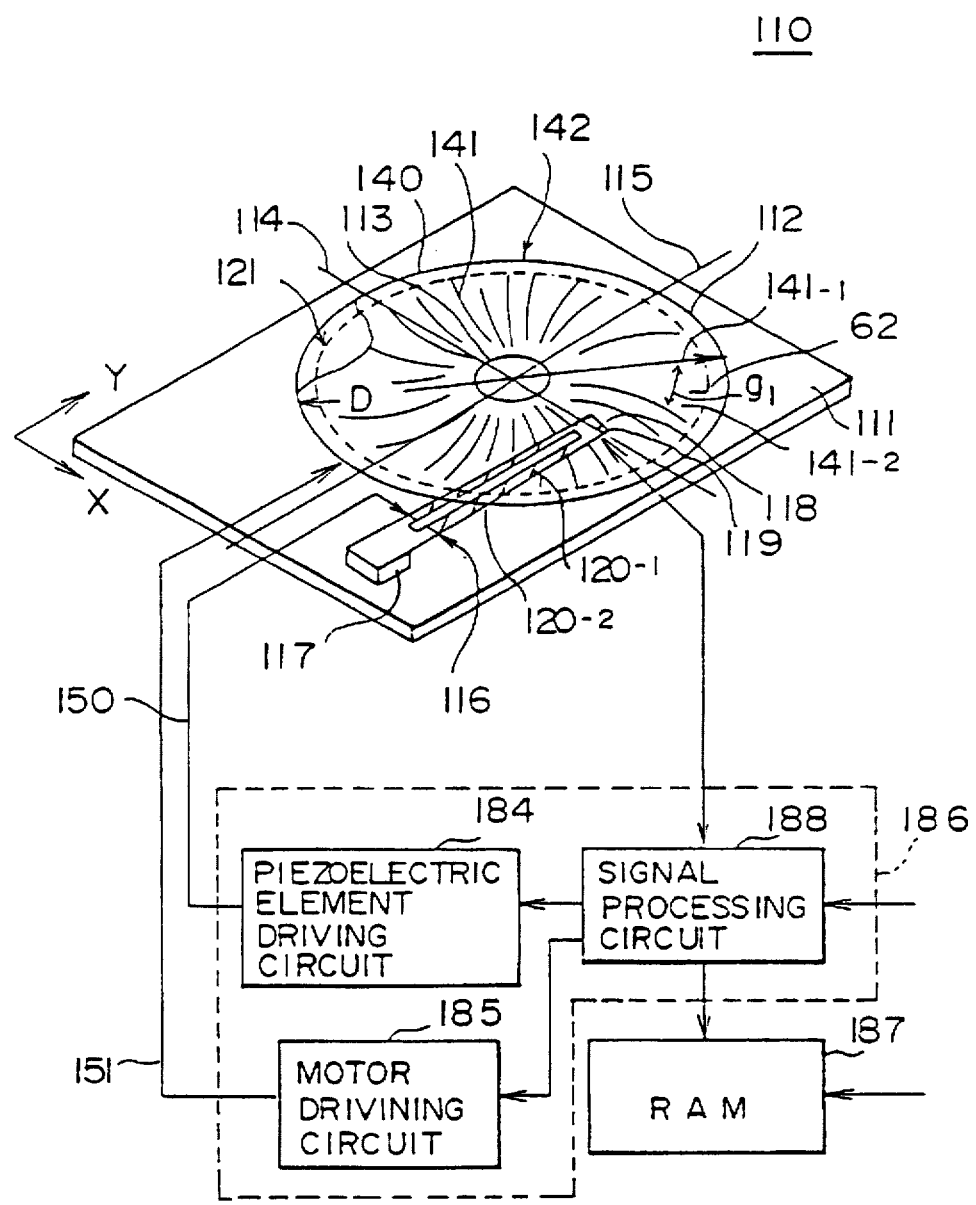
FIG. 22 is a diagram illustrating a third embodiment of the present invention.
Figure 23:
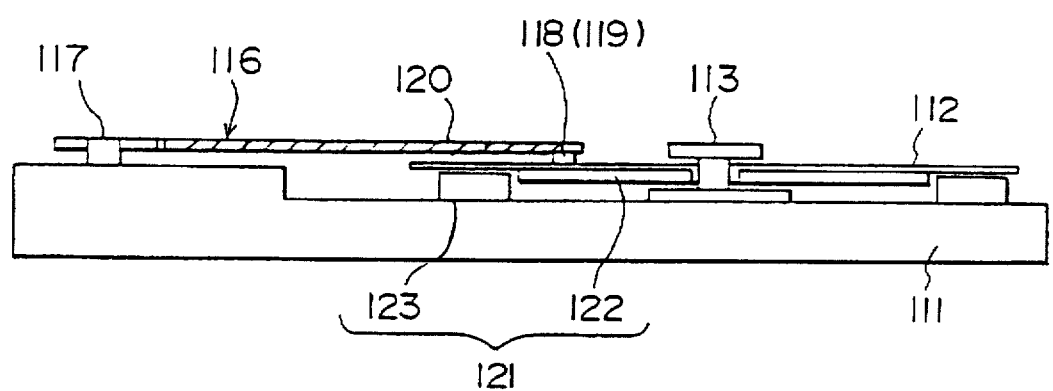
FIG. 23 is a cross sectional view illustrating a storage unit shown in FIG. 22.

FIG. 22 shows essential parts of a magnetic storage device according to a third embodiment of the present invention. Referring to FIG. 22, a substrate 111 is made of ceramic or silicon. A magnetic disk 112 is rotatably supported by a shaft 113 mounted in the middle of the substrate 111. The diameter of the magnetic disk 112 is, for example, approximately 10 mm. A head supporting arm 116 is provided on the substrate 111. An end of the head supporting arm 116 is mounted on a block 117 fixed on the substrate 111. The head supporting arm 116 extends toward the magnetic disk 112 in a direction parallel to a Y-axis 115 crossing a center of the shaft 113. A tip end of the head supporting arm 116 is located over an X-axis 114 crossing a center of the shaft 113 in perpendicular to the Y-axis 115. A recording head 118 for recording information and a MR element 119 for reproducing information are mounted on the tip end of the head supporting arm 116. The recording head 118 and the MR element 119 forms a head assembly and the head assembly slides on the magnetic disk 112. A slit is formed in the middle of the head supporting arm 116. Both sides of the head supporting arm 116 are provided with piezoelectric elements $120_{-1}$ and $120_{-2}$ each of which is made of ZnO or PZT. An electrostatic stepping motor 121 is formed between the magnetic disk 112 and the substrate 111, as shown in FIG. 23. The electrostatic stepping motor 121 comprises a rotor 122 and a stator 123. The rotor 122 is rotatably mounted on the shaft 113 and the magnetic disk 112 is fixed on the surface of the rotor 122, so that the magnetic disk 112 is rotatably supported by the shaft 113. The stator 123 is mounted on the substrate so as to surround the rotor 122 with a predetermined gap. A storage unit 110 having the above structure is produced by a micro-machining technology using a thin-film process. The storage unit 110 is encapsulated in the case 12 with a circuit unit 186 (LSI) as shown in FIG. 2. The circuit unit 186 includes a signal processing circuit 188, a piezoelectric element driving circuit 184 and a motor driving circuit 185 as shown in FIG. 22.

Position information 140 indicating positions on the magnetic disk 112 has been previously recorded on the fringe of the magnetic disk 112, as shown in FIG. 22. Recording and reproducing operations are carried out as follows.

Figure 24A:
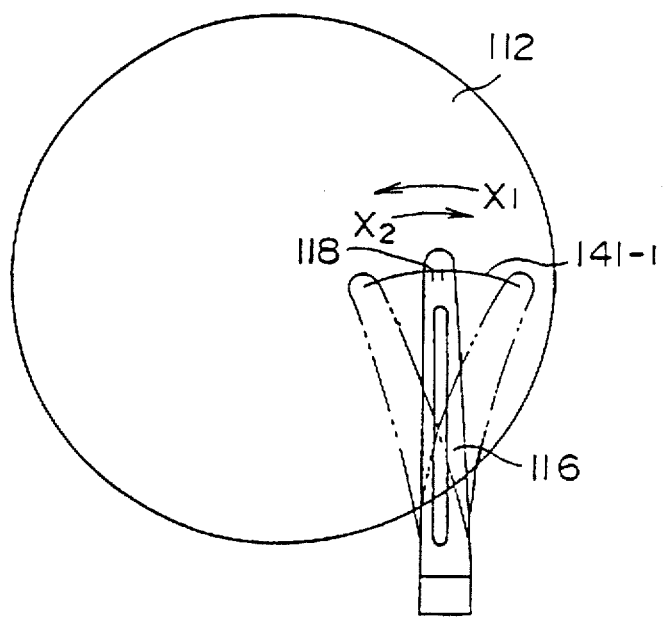
FIGS. 24A and 24B are diagrams illustrating motions of the arm on which a head is mounted.

In a state where the magnetic disk 112 is not being rotated, driving signals which are AC voltages having phases opposite to each other are supplied to the piezoelectric elements $120_{-1}$ and $120_{-2}$. Due to the contraction and expansion of the piezoelectric elements $120_{-1}$ and $120_{-2}$, the head supporting arm 116 is vibrated at a few thousands Hertz (KHz) in simple harmonic motion in directions X1 and X2 as shown in FIG. 24A. Due to the vibration of the head supporting arm 116, the recording head 118 reciprocates in a radius direction of the magnetic disk 112, so that a recording track $141_{-1}$ extending from the inside to the outside is formed on the magnetic disk 112. Signals are recorded on the recording track $141_{-1}$ via the recording head 118.

Figure 24B:
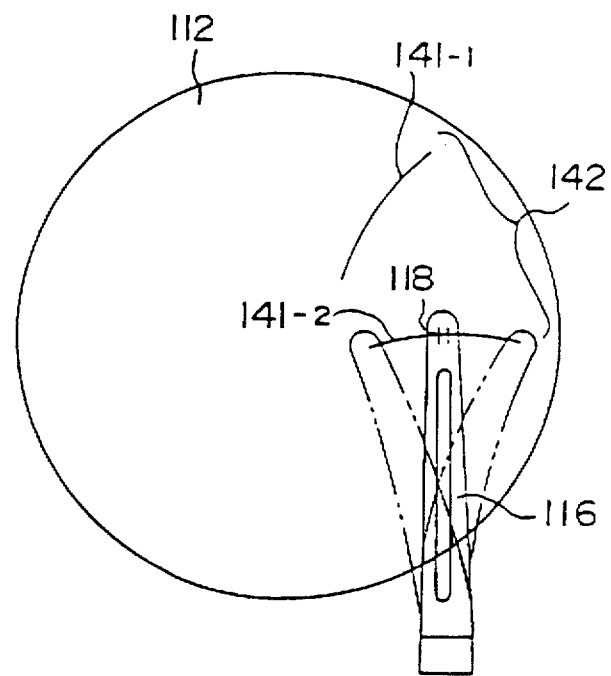

Then, the electrostatic stepping motor is driven so as to rotate by predetermined steps, and the magnetic disk 112 is rotated by a predetermined angle and stops, as shown in FIG. 24B. In this state, the head supporting arm 116 is vibrated in simple harmonic motion, so that a recording track $141_{-2}$ is formed at another position of the magnetic disk 112. The vibration of the head supporting arm 116 and the rotation of the electrostatic stepping motor 121 are alternately carried out, so that a track pattern 142 including a plurality of the recording tracks radiately arranged is formed on the magnetic disk 112. As the track pattern 142 is formed on the whole surface of the magnetic disk 112, a large number of information can be recorded on the magnetic disk 112.

The frequency of each of the driving signals for the piezoelectric elements $120_{-1}$ and $120_{-2}$ is substantially equal to a resonance frequency of the mechanism of the head supporting arm 116. Thus, the head supporting arm 116 can be stably vibrated with a small power, and the recording tracks 141 can be accurately formed on the magnetic disk 112.

Figure 25:
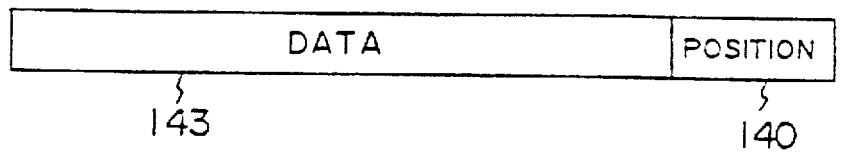
FIG. 25 is a diagram illustrating a format of each of recording tracks.

Information is recorded in each of the recording tracks in accordance with a data format as shown in FIG. 25. In FIG. 25, the position information 140 is recorded on a region in each of the recording tracks 141 positioned on the perimeter of the magnetic disk 112, and other regions in each of the recording tracks 141 are provided with recording data 143.

A detailed operation of the magnetic storage device will be described below with reference to FIGS. 26 and 27.

Figure 26:
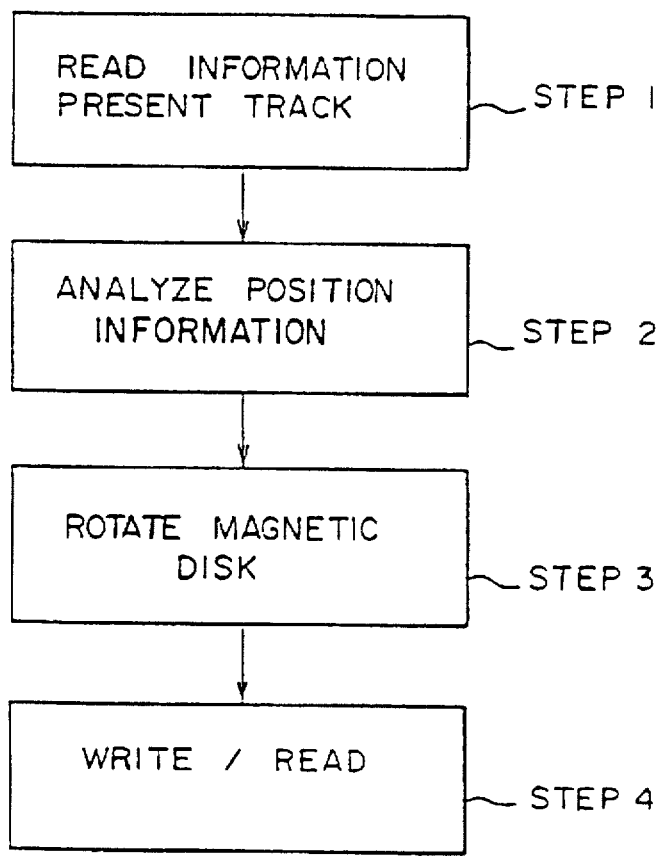
FIG. 26 is a flow chart illustrating a write operation in which information is recorded on a magnetic disk.
Figure 27:
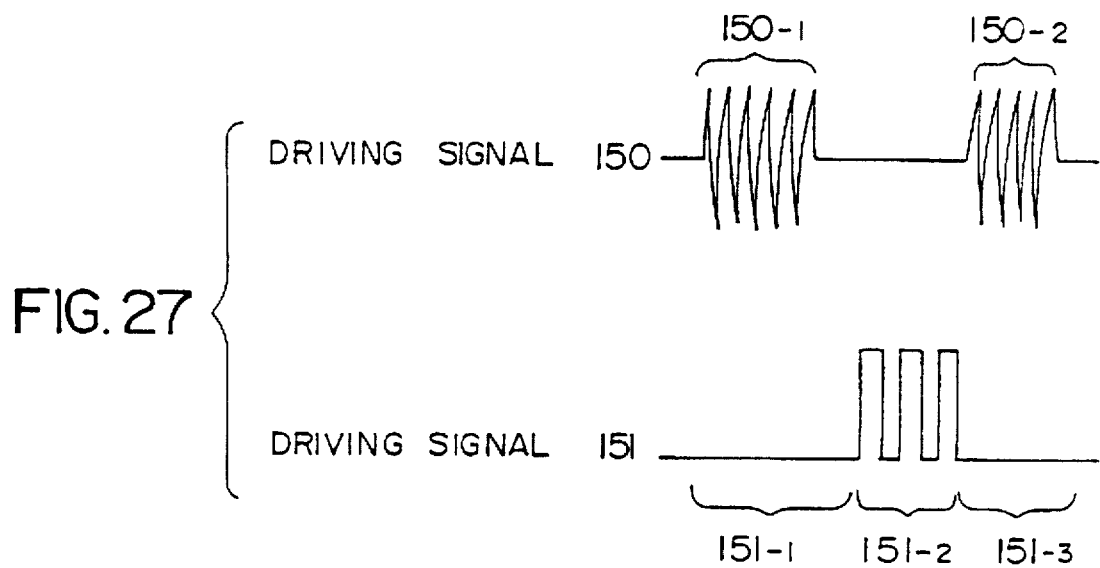
FIG. 27 is a diagram illustrating wave forms of driving signals for piezoelectric elements and a motor.

Referring to FIG. 26, step 1 reads out information from a recording track on which the MR element 119 is presently located. At this time, the output voltage from the motor driving circuit 185 is zero as shown by a period $151_{-1}$ in FIG. 27, so that the electrostatic stepping motor 121 stops and the magnetic disk is not rotated. The piezoelectric driving circuit 184 supplies the driving signal which is the AC voltage as shown by $150_{-1}$ in FIG. 27 to the piezoelectric elements $120_{-1}$ and $120_{-2}$, so that the piezoelectric elements $120_{-1}$ and $120_{-2}$ are driven and the head supporting arm 116 is vibrated in simple harmonic motion. During the vibration of the head supporting arm 116, data is read out from the recording track via the MR element 119. Next, step 2 analyzes the position information. That is, the signal processing circuit 188 analyzes the position information based on data read out from the recording track. Step 3 rotates the magnetic disk 112 by a predetermined angle corresponding to a difference between the recording track on which the recording head 118 and the MR element 119 are presently located and a recording track on/from which data should be recorded/reproduced next. That is, the signal processing circuit 188 calculates the difference between the recording track on which the recording head 118 is located and the recording track on/from which the data should be recorded/reproduced next, and the motor driving circuit 185 outputs a driving signal having a number of pulses corresponding to the difference calculated by the signal processing circuit 188 as shown by $151_{-2}$ in FIG. 27. The electrostatic stepping motor 121 is driven by the driving signal for a predetermined number of steps. Then the driving signal is inactivated as shown by $151_{-3}$ in FIG. 27, so that the electrostatic stepping motor 121 stops. Due to the rotation of the magnetic disk 112 by the predetermined angle, the MR element 119 reaches the recording track on which the data should be read out next.

Next, step 4 reads/writes data from/on the recording track. In this case, the piezoelectric element driving circuit 184 outputs the driving signal shown by $150_{-2}$ in FIG. 27, and the arm 16 is vibrated in simple harmonic motion in a state where the magnetic disk 112 stops. During the vibration of the head supporting arm 116, either the data is read out from the recording track via the MR element 119 or the data is recorded on the recording track via the recording head 118. The data read out from the magnetic disk 112 is supplied from the signal processing circuit 33 to a random access memory (RAM) 187, provided outside of this magnetic storage device, and the data is then written therein. The data stored in the RAM 187 can be accessed by an external unit.

Figure 28:
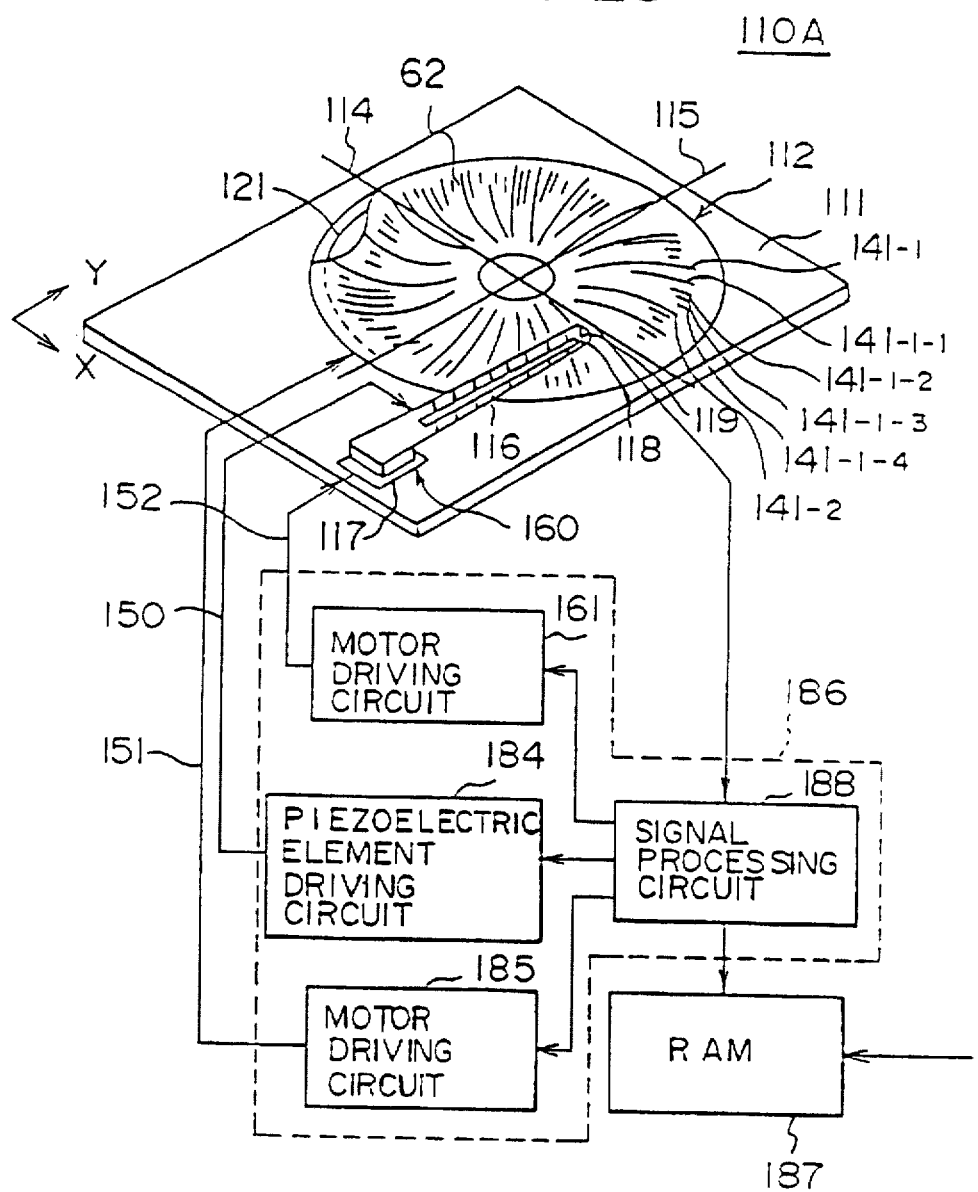
FIG. 28 is a first modification of the third embodiment.
Figure 29:
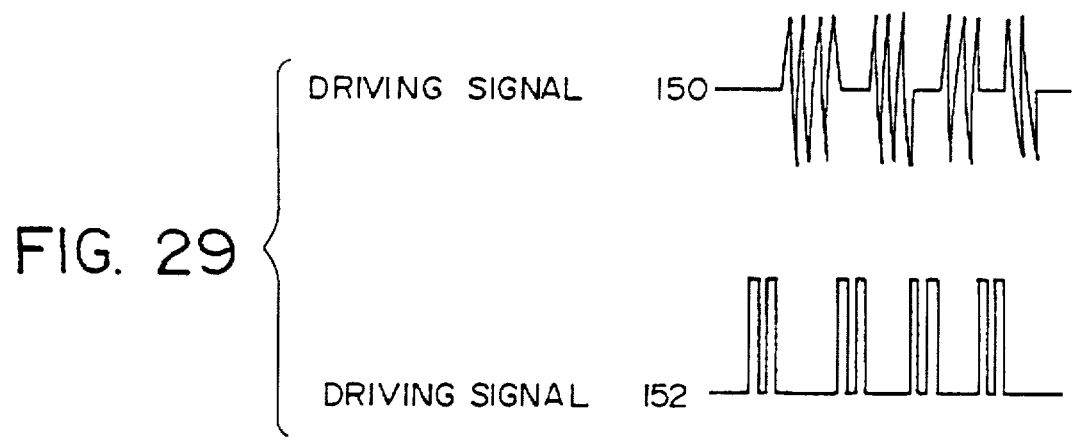
FIG. 29 is a diagram illustrating wave forms of driving signals for piezoelectric elements and a motor in the first modification of the third embodiment.

A description will now be given of a first modification of the third embodiment with reference to FIGS. 28, 29 and 30. In FIG. 28, those parts which are the same as those shown in FIG. 22 are given the same reference numbers.

Referring to FIG. 28, a storage unit 110A has means for moving the head supporting arm 116 in the Y-direction. That is, an electrostatic motor 160 for moving the block 117 on which the arm 116 is mounted is formed on the substrate 111, and a motor driving circuit 161 for driving the electrostatic motor 160 is provided with the circuit unit 186.

In the storage unit 110 shown in FIG. 22, the recording tracks 141 are radiately arranged in the magnetic disk 112. Thus, a gap g1 between adjacent recording tracks is large in an outside area 62 of the magnetic disk 112. The outside area 62 of the magnetic disk 112 is not effectively used for recording data. In this modification of the third embodiment, recording tracks can be also formed on the outside area 62 of the magnetic disk 112. The recording tracks formed on the outside area 62 must be shorter than the recording tracks radiately formed on the magnetic disk 112 in a normal manner described above to prevent them from overlapping. Thus, each of the recording tracks formed on the outside area 62 of the magnetic disk 112 is referred to as a short recording track.

The electrostatic motor 160 is driven step by step, each step being one n-th of the gap g1 where n is a small integer. The short recording tracks are formed on the outside area 62 between the recording tracks as follows.

Figure 30:
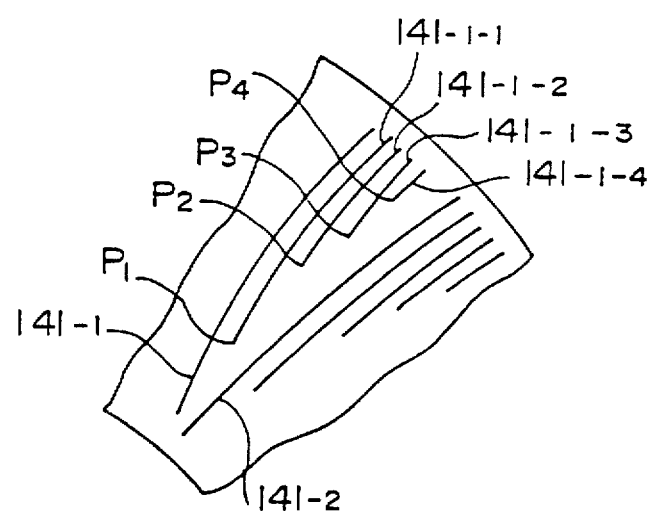
FIG. 30 is a diagram illustrating recording tracks formed on the magnetic disk shown in FIG. 28.

After the recording tracks $140_{-1}$ and $140_{-2}$ are radiately formed in the manner described in the third embodiment, the short recording tracks $141_{-1-1}$–$141_{-1-4}$ are formed, for example, as shown in FIG. 30. Due to the rotation of the electrostatic stepping motor 121, the recording head 118 is located on the recording track $141_{-1}$. After that, a piezoelectric element driving signal 150 supplied to the piezoelectric elements $120_{-1}$ and $120_{-2}$ of arm 116 and a motor driving signal 152 supplied to the electrostatic motor 160 are alternately activated, as shown in FIG. 29. Thus, the moving of the head supporting arm 116 in the Y-direction and the vibration of the head supporting arm 116 in simple harmonic motion are alternately repeated, so that short recording tracks $141_{-1-1}$–$141_{-1-4}$ are successively formed on the outside area 64 between the recording tracks $141_{-1}$ and $141_{-2}$, as shown in FIG. 30. In this case, information regarding end positions P1, P2, P3 and P4 have been recorded on the magnetic disk 112 as position information, and the short recording tracks $141_{-1-1}$–$141_{-1-4}$ are respectively formed between the end points P1, P2, P3 and P4 and predetermined points on the fringe of the magnetic disk 112.

According to the first modification of the third embodiment, as the short recording tracks are formed on the outside area 62, a large amount of information can be stored in the magnetic disk 112.

Due to the fine stepping operation of the electrostatic stepping motor 121, the short recording tracks can be formed on the outside area 62 without moving the head supporting arm in the Y-direction.

Figure 31:
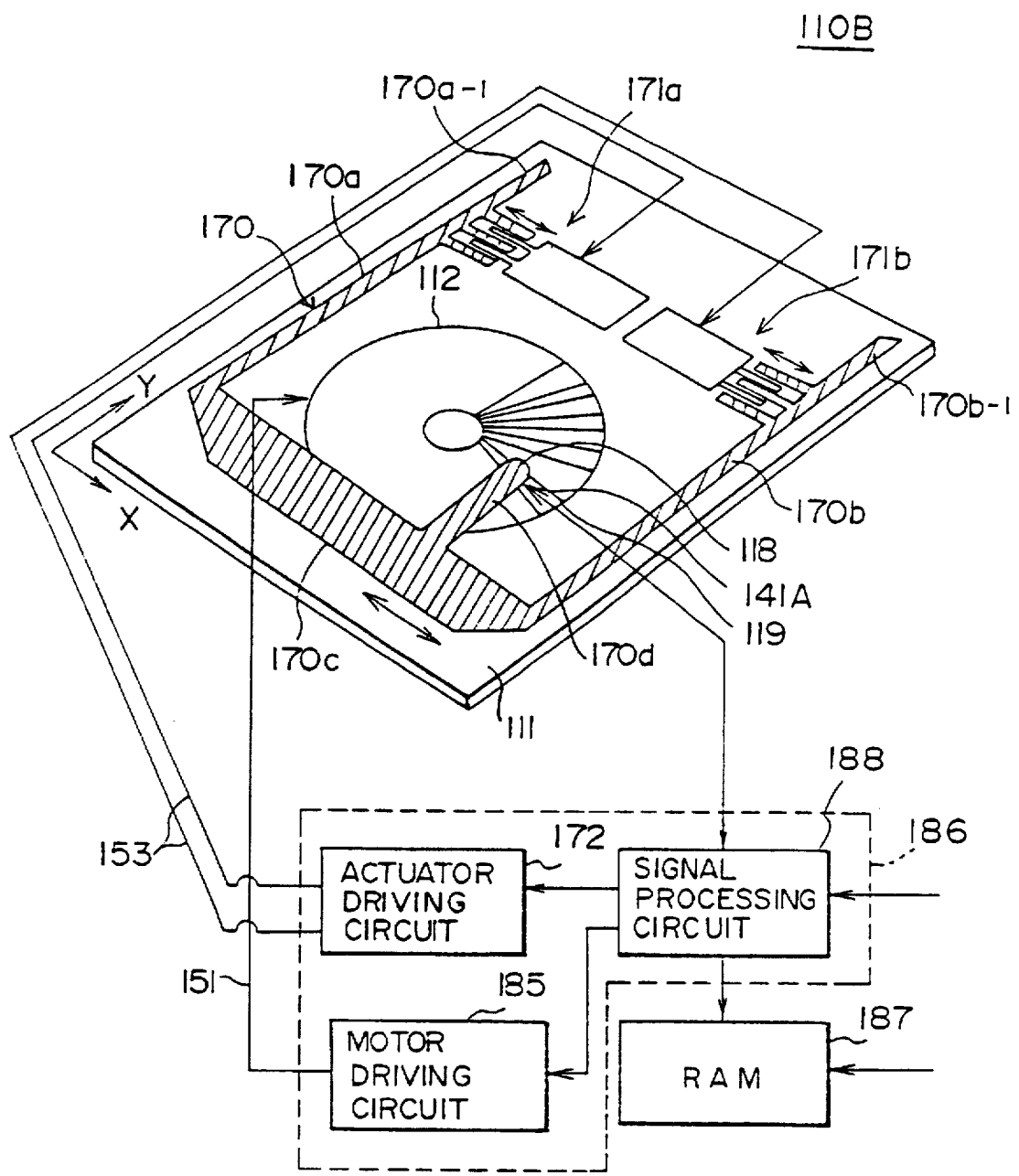
FIG. 31 is a diagram illustrating a second modification of the third embodiment.

A description will now be given of a second modification of the third embodiment of the present invention with reference to FIG. 31. In FIG. 31, those parts which are the same as those shown in FIG. 22 are given the same reference numbers.

In the second modification of the third embodiment, the recording head 118 and the MR element 119 are linearly moved in the X-direction. Referring to FIG. 31, a head supporting member 170 having arms 170a and 170b, a lateral frame 170c and a head supporting arm 170d projecting from the lateral frame 170c in the Y-direction is provided on the substrate 111, in the same manner as that in the first embodiment shown in FIG. 3. End portions $170a_{-1}$ and $170b_{-1}$ are fixed on the substrate 111. The recording head 118 and the MR element 119 are mounted at a tip end of the head supporting arm so as to slide on the magnetic disk 112. Electrostatic actuators 171a and 171b having comb electrodes are respectively provided adjacent to the end portions $170a_{-1}$ and $170b_{-1}$ of the arms 170a and 170b. The circuit unit 186 is provided with an actuator driving circuit 172. The actuator driving circuit 172 outputs driving signals 153 for driving the electrostatic actuators 171a and 171b. The electrostatic actuators 171a and 171b are driven by the driving signals 153 so as to move in the X-direction, so that the arms 170a and 170b are moved in the X-direction. As a result, the lateral arm 170c and the head supporting arm 170d linearly move in the X-direction. While the head supporting arm 170d is linearly moving in the X-direction, information is recorded via the recording head 118 so that a linear recording track is formed on the magnetic disk 112. When the writing operation is repeated, the linear recording tracks are radially formed on the magnetic disk as shown in FIG. 31.

A description will now be given of a third modification of the third embodiment of the present invention with reference to FIGS. 32, 33, 34 and 35.

Figure 32:
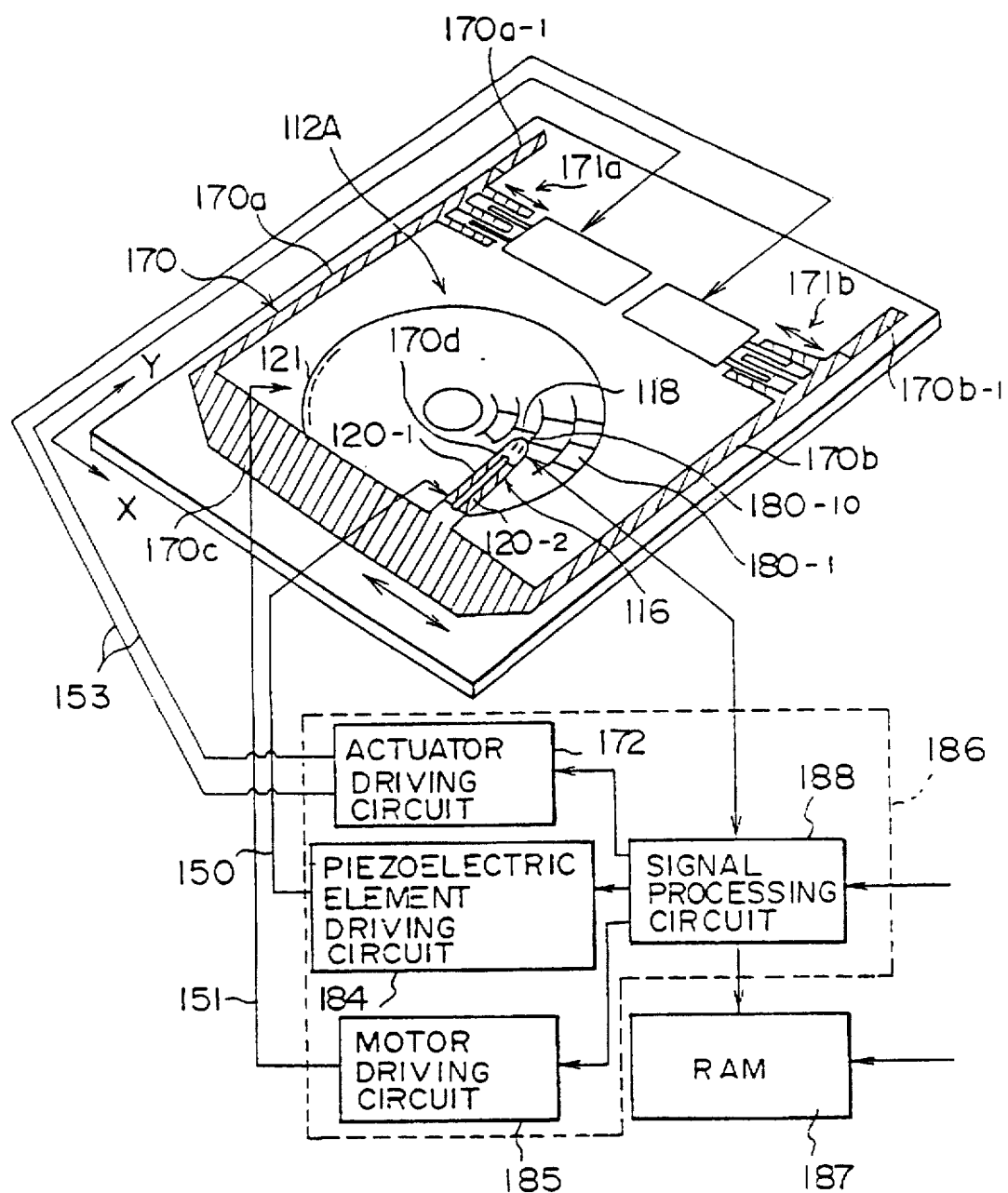
FIG. 32 is a diagram illustrating a third modification of the third embodiment.

In FIG. 32, those parts which are the same as those shown in FIGS. 22 and 28 are given the same reference numbers.

Figure 33:
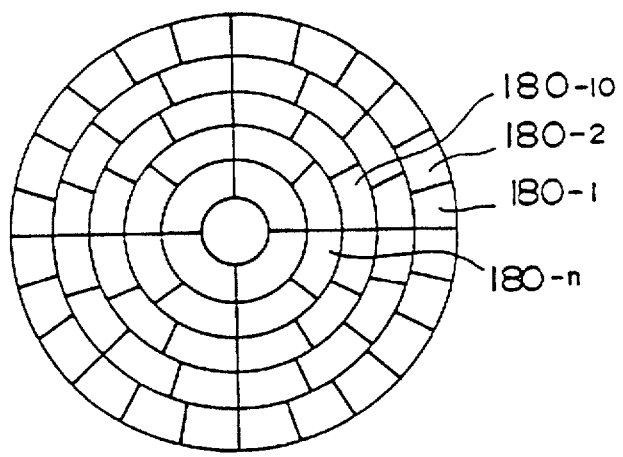
FIG. 33 is a diagram illustrating data cells formed on the magnetic disk shown in FIG. 32.

Referring to FIG. 32, the magnetic disk 112 is rotatably mounted on the substrate 111. A plurality of data cells 180 are arranged on the magnetic disk 112A in a radius direction thereof as shown in FIG. 33. The data cells 180 have approximately the same size as each other and each of them has a fan-shaped form. The piezoelectric elements $120_{-1}$ and $120_{-2}$ are mounted on both sides of the head supporting arm $170d$. The magnetic disk 121 is rotated by the electrostatic stepping motor driven by the driving signal output from the motor driving circuit 185, and the head supporting arm $170d$ is linearly moved in the X-direction by the electrostatic actuators $171a$ and $171b$ driven by driving signals 153 output from the actuator driving circuit 172. Due to the rotation of the magnetic disk 112 and the moving of the head supporting arm $170d$, the recording head 118 and the MR element 119 are placed on each of the data cells 180 on the magnetic disk 121.

Figure 34:
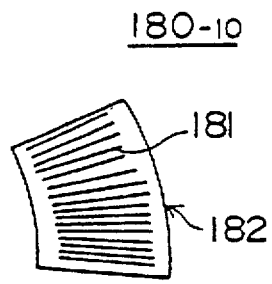
FIG. 34 is a diagram illustrating recording tracks formed on each of the data cells shown in FIG. 33.

In a state where the recording head 118 and the MR element 119 are located on a data cell $180_{-10}$, the piezoelectric elements $120_{-1}$ and $120_{-2}$ are driven by the driving signal 150 output from the piezoelectric driving circuit 184. Due to the driving of the piezoelectric elements $120_{-1}$ and $120_{-2}$, the head supporting arm $170d$ is vibrated in simple harmonic motion in the X-direction. While the head supporting arm $170d$ is vibrating, information is recorded on the data cell $180_{-10}$, so that a recording track is formed on the data cell $180_{-10}$. Then, every time the forming of each recording track is completed, the magnetic disk 121 is rotated by a predetermined angle. As a result, a plurality of recording tracks 181 are radiately formed on the data cell $180_{-10}$ so that a track pattern 182 is formed thereon, as shown in FIG. 34. On each of other data cells, a track pattern is formed in the same manner as that in the data cell $180_{-10}$.

Information is recorded in each of the recording tracks 181 in accordance with the format shown in FIG. 25.

Figure 35:
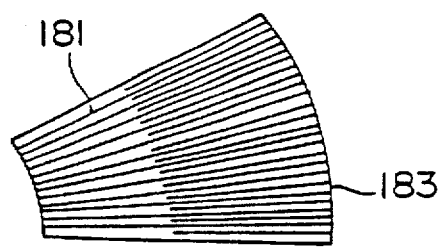
FIG. 35 is a diagram illustrating another example of recording tracks formed on each of the data cells shown in FIG. 33.

A short recording track 183 can be recorded on an outer portion of the magnetic disk located between the recording tracks 181 formed in the above manner, as shown in FIG. 35.

Sizes of the data cells 180 are approximately equal to each other so that data capacities of the data cells 180 are approximately equal to each other. As a result, the data can be easily processed.

A description will now be given of a fourth embodiment of the present invention with reference to FIGS. 36-40.

Figure 36:
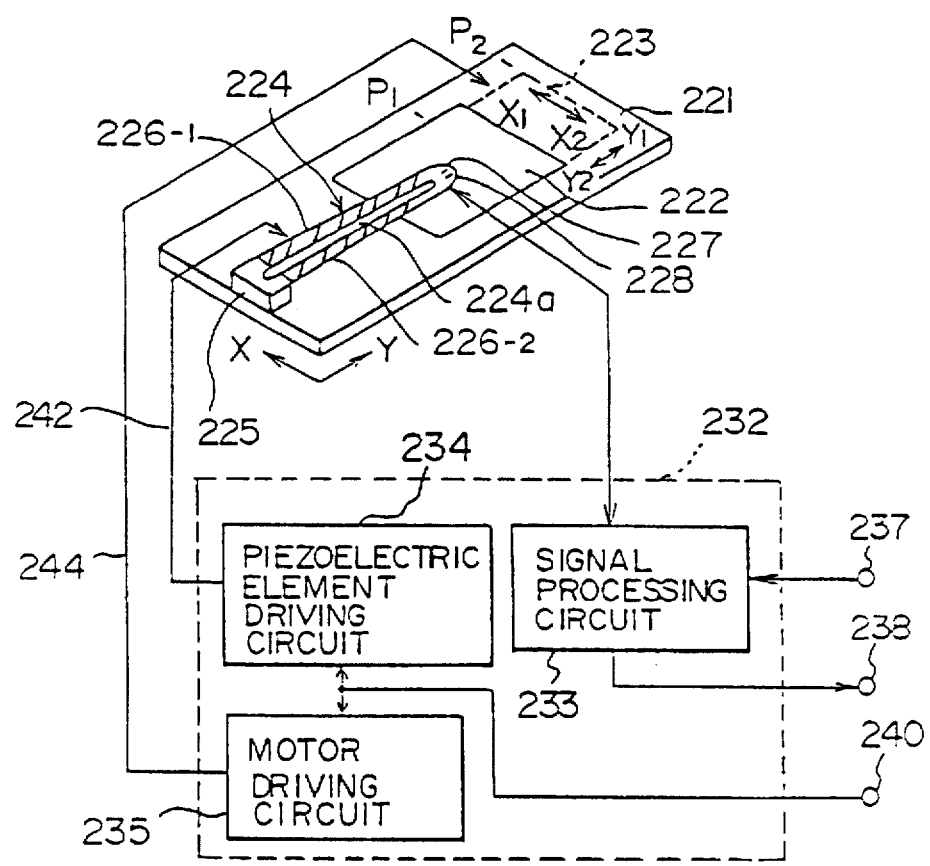
FIG. 36 is a diagram illustrating a fourth embodiment of the present invention.

FIG. 36 shows a structure of a magnetic storage device 220 according to the fourth embodiment of the present invention. Referring to FIG. 36, a magnetic recording plate 222 is movably mounted on a substrate 221 made of ceramic or silicon. The magnetic recording plate 222 is a square in which each side is a few millimeter (mm). The magnetic recording plate 222 is moved by an electrostatic motor 223 in the Y-direction. The magnetic recording plate 222 does not have position information of each recording track formed thereon. An end of a head supporting arm 224 is fixed on the block 225 mounted on the substrate 221. The head supporting arm 224 extends in the Y-direction. A slit $224a$ is formed in the middle of the head supporting arm 224, and piezoelectric elements $226_{-1}$ and $226_{-2}$ each made of $ZnO_2$ are mounted on respective sides of the head supporting arm 224. A magnetic head 227 used for recording information and an MR element 228 used for reproducing information are mounted at a tip end of the head supporting arm 224 so as to slide on the surface of the magnetic recording plate 222.

The magnetic storage device 220 having the above structure is produced in accordance with a micro-machining technology using a thin-film process. The storage unit is encapsulated in the case with a circuit unit as shown in FIG. 2. The circuit unit 232 includes a signal processing circuit 233, a piezoelectric element driving circuit 234 and a motor driving circuit 235 as shown in FIG. 36.

Figure 37A:
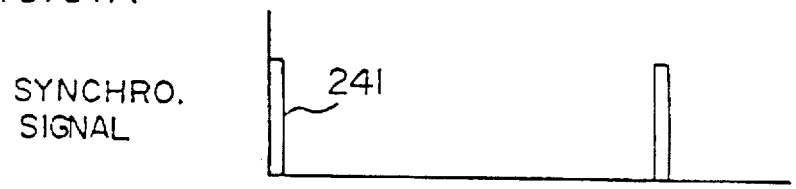
FIG. 37 is a wave form chart illustrating wave forms of a synchronous signal, a driving signal for piezoelectric elements and a driving signal for a motor.
Figure 37B:
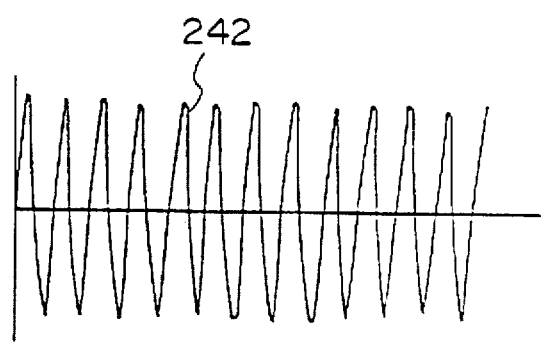
Figure 37C:
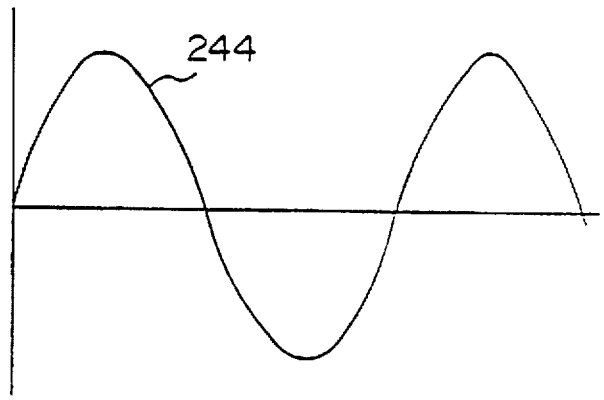
Figure 38A:
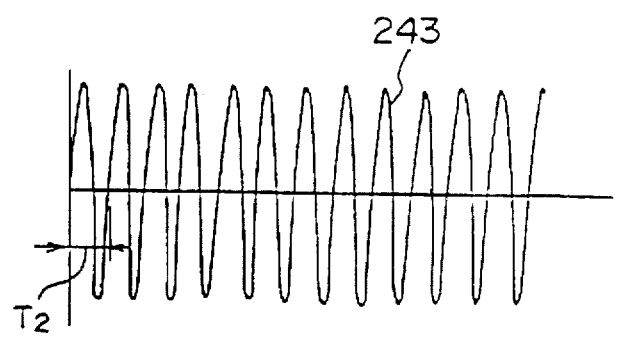
FIG. 38 is a diagram illustrating simple harmonic motions of a magnetic head and a magnetic recording plate.
Figure 38B:
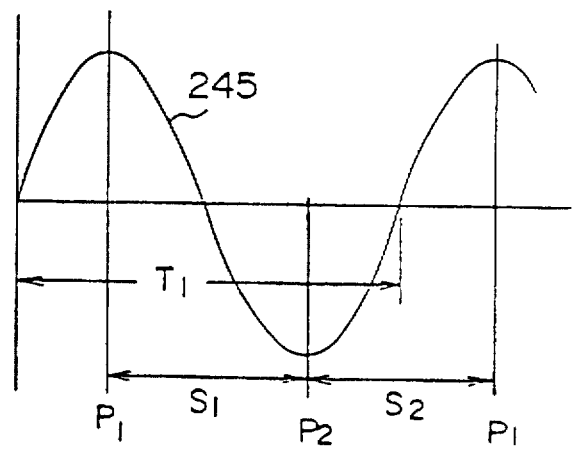

The piezoelectric element driving circuit 234 and the motor driving circuit 235 output sine-wave signals without relation to operations in the signal processing circuit 233. A synchronizing signal 241 as shown in FIG. 37(A) is supplied from an external unit to the piezoelectric element driving circuit 234 and the motor driving circuit 235 via a terminal 240. The piezoelectric element driving circuit 234 outputs a driving signal 242, having a sine wave form as shown in FIG. 37(B), in synchronism with the synchronous signal 241. Due to the driving of the piezoelectric elements $226_{-1}$ and $226_{-2}$, the head supporting arm 224 is vibrated in the X-direction, and the magnetic head 227 and the MR element 228 are vibrated in simple harmonic motion as shown by a wave form 243 in FIG. 38(A) at a frequency of, for example, a few thousands Hertz (KHz). The motor driving circuit 235 outputs a driving signal 244, having a sine wave form as shown in FIG. 37(C), in synchronism with the synchronous signal 241. The electrostatic motor 223 is driven by the driving signal 244. Due to the driving of the electrostatic motor 223, the magnetic recording plate 222 is vibrated in simple harmonic motion in the Y-direction as shown by a wave form 245 in FIG. 38(B) at a frequency of a few tens Hertz (Hz). The period T1 of the simple harmonic motion indicated by the wave form 245 (the magnetic recording plate 222) and the period T2 of the simple harmonic motion indicated by the wave form 243 (the piezoelectric elements $226_{-1}$ and $226_{-2}$) are determined so that a ratio T1/T2 is for example, 150. It is preferable that the ratio T1/T2 be greater than 100.

In a state where the the magnetic head 227 and the MR element 228 are being vibrated, while the magnetic head 227 and the MR element 228 slide on the magnetic recording plate 222 in a direction X1, data is recorded on the magnetic recording plate 222 via the magnetic head 227 or data is reproduced from the magnetic recording plate 222 via the MR element 228. While the magnetic head 227 and the MR element 228 slide on the magnetic recording plate 222 in an X2-direction, neither recording nor reproducing of data is carried out.

Figure 39A:
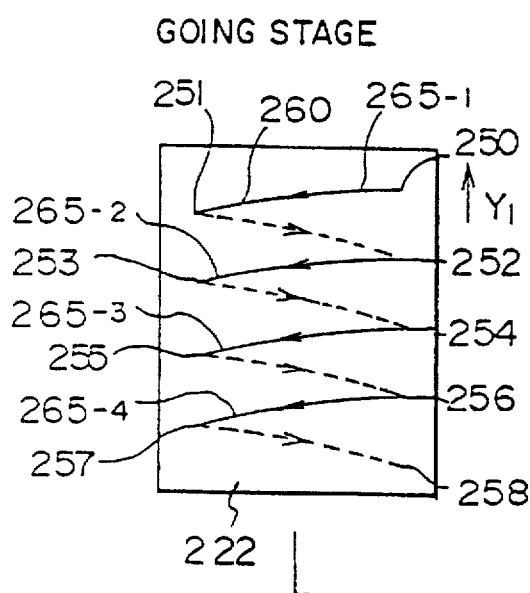
FIG. 39 is a diagram illustrating recording tracks formed on the magnetic recording plate shown in FIG. 36.

A case where the magnetic recording plate 222 moves in the Y1-direction is referred to as a going stage S1, and a case where the magnetic recording palate 222 moves in the Y2-direction opposite to the Y1-direction is referred to as a returning stage S2. In the going stage S1, an edge of the magnetic recording plate 222 moves from P1 to P2 as shown in FIG. 36. While the magnetic recording plate 222 is moving in the Y1-direction, the magnetic head 227 and the MR element 228 are vibrated. Thus, the magnetic head 227 and the MR element 228 scan the magnetic recording plate 222 in zigzags from a starting point 250 to an end point 258 via turning points 251, 252, 253, 254, 255, 256 and 257 as shown in FIG. 39(A). That is, a zigzag locus 260 of the magnetic head 227 (the MR element 228) is formed on the surface of the magnetic recording plate 222.

Figure 39B:
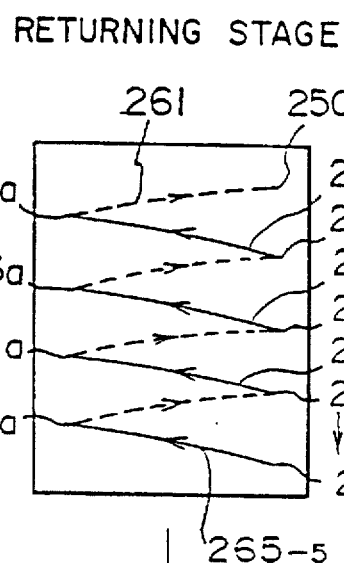

When the edge of the magnetic recording plate 222 reaches the point P2, the magnetic recording plate 222 returns and moves in the Y2-direction. That is, the returning stage S2 starts. In the returning stage S2, the magnetic recording plate 222 moves in the Y2-direction. While the magnetic recording plate 222 is moving in the Y2-direction, the magnetic head 227 and the MR element 228 are vibrated in simple harmonic motion. Thus, the magnetic head 227 and the MR element 228 scan the magnetic recording plate 222 in zigzags returning from the end point 258 to a point $250a$ via turning points $257a$, $256a$, $255a$, $254a$, $253a$, $252a$ and $251a$ as shown in FIG. 39(B). That is, a zigzag shaped locus 261 of the magnetic head 227 (the MR element 228) is formed on the surface of the magnetic recording plate 222. Here, as the simple harmonic motion of the magnetic head 227 (MR element 228) is synchronized with that of the magnetic recording plate 222, the turning points 251a–257a in the returning stage S2 are respectively equal to the turning points 251–257 in the going stage S1. Thus, the zigzag shaped locus 260 formed in the going stage S1 and the zigzag shaped locus 261 formed in the returning stage S2 overlap.

In the going stage S1, recording tracks $265_{-1}$, $265_{-2}$, $265_{-3}$ and $265_{-4}$ indicated by continuous lines in FIG. 39(A) are formed on the magnetic recording plate 222. That is, information input to the terminal 237 of the circuit unit 232 is recorded on the recording tracks $265_{-1}$, $265_{-2}$, $265_{-3}$ and $265_{-4}$ via the magnetic head 27 in the going stage S1. No tracks are formed on dashed lines shown in FIG. 39(A).

In the returning stage S2, recording tracks $265_{-5}$, $265_{-6}$, $265_{-7}$ and $265_{-8}$ indicated by continuous lines in FIG. 39(B) are formed on the magnetic recording plate 222. That is, information is recorded on the recording tracks $265_{-5}$, $265_{-6}$, $265_{-7}$ and $265_{-8}$ via the magnetic head 227 in the returning stage S2. When the magnetic head 227 is located on dashed lines shown in FIG. 39(B), no signal is supplied to the magnetic head 227. Thus, no information is recorded on the dashed lines.

Figure 39C:
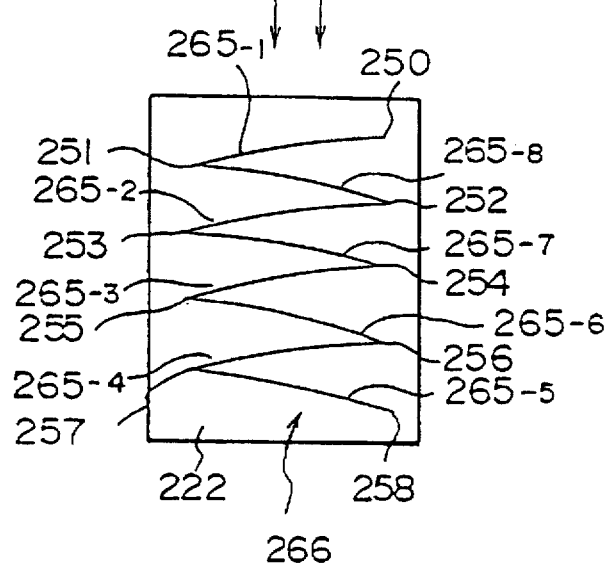

As a result, a zigzag track pattern 266 formed of recording tracks $265_{-1}$–$265_{-8}$ is formed on the magnetic recording plate 222, as shown in FIG. 39(C).

According to the fourth embodiment, as the simple harmonic motion of the magnetic head 227 (the MR element 228) and the simple harmonic motion of the magnetic recording plate 222 are synchronized with each other, the magnetic head 227 (the MR element 228) can always accurately trace the recording tracks $265_{-1}$–$265_{-8}$. Thus, it is neither necessary to provide position information on the recording tracks $265_{-1}$–$265_{-8}$, nor to control the position of the magnetic head 227 (the MR element 228) on the magnetic recording plate 222 based on position information. As a result, the magnetic storage device 220 can be easily controlled.

Figure 40:
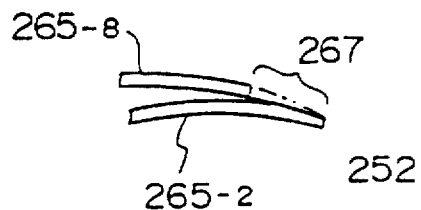
FIG. 40 is a diagram illustrating recording tracks adjacent each other.

In the recording tracks $265_{-1}$–$265_{-8}$ formed on the magnetic recording plate 222 shown in FIG. 39(C), an end of each recording track overlaps with an end of an adjacent recording track. For example, in a case of recording tracks $265_{-2}$ and $265_{-8}$, an end portion 267 of the recording tracks $265_{-8}$ is not used for recording information, as shown in FIG. 40.

While the MR element 228 is moving in the X1-direction, information is reproduced via the MR element 228. The reproduced signal output from the MR element 228 is processed by the signal processing circuit 233 and output from the terminal 238.

Figure 41:
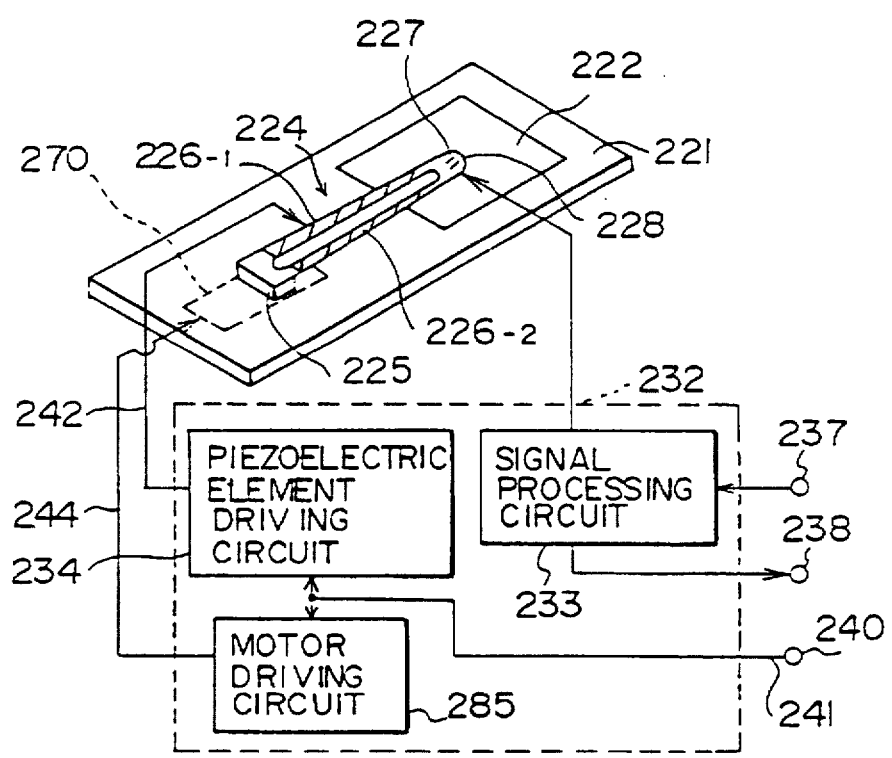
FIG. 41 is a first modification of the fourth embodiment.

FIG. 41 shows a first modification of the fourth embodiment of the present invention. In the first modification, the magnetic recording plate 222 is fixed on the substrate 221 and the supporting arm 224 supporting the magnetic head 227 and the MR element 228 is vibrated by an electrostatic motor 270, in the Y-direction, in simple harmonic motion at a few tens Hertz (Hz). The simple harmonic motions of the head supporting arm 224 in both the X-direction and Y-direction are synchronized with each other.

Figure 42:
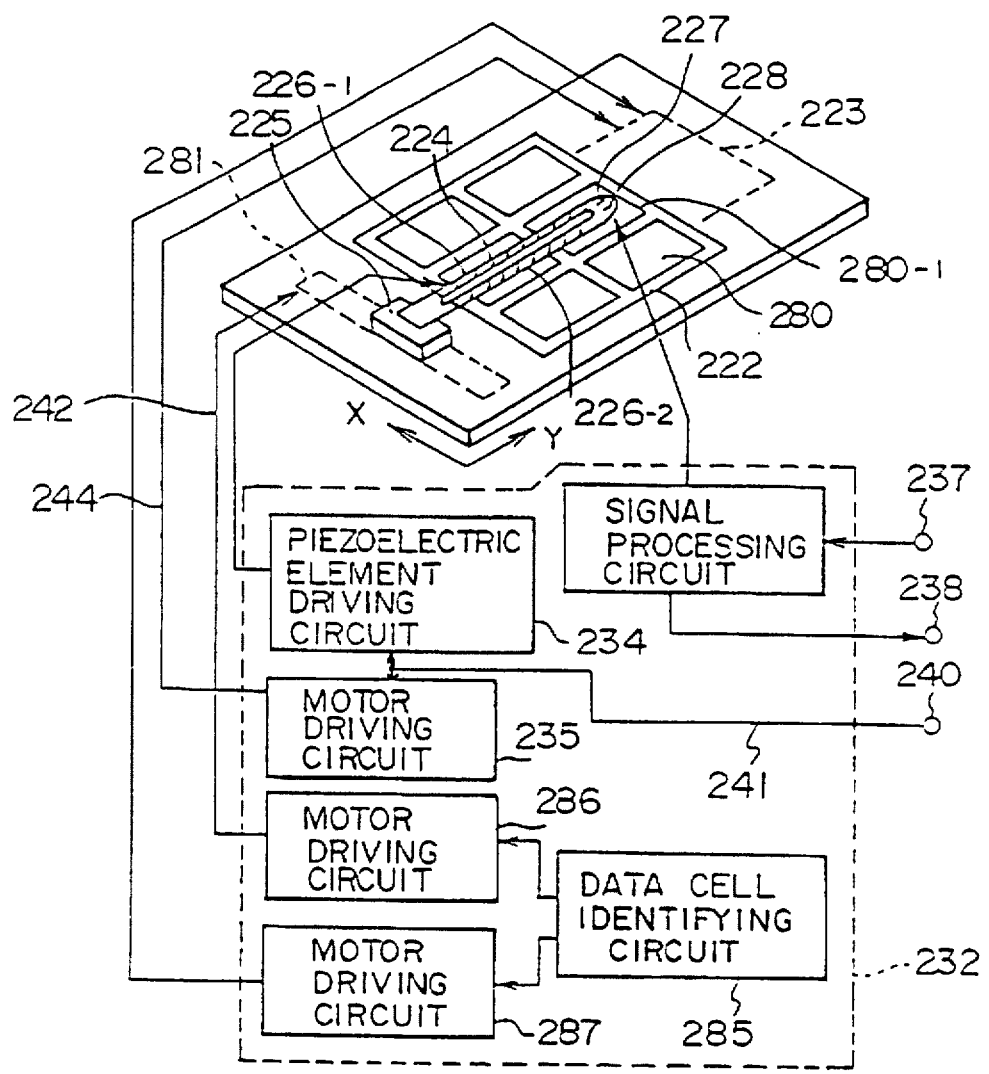
FIG. 42 is a second modification of the fourth embodiment.

FIG. 42 shows a second modification of the fourth embodiment of the present invention. In the second modification, a plurality of data cells 280 are formed on the surface of the magnetic recording plate 222. The magnetic head 227 and the MR element 228 are positioned on each of the data cells 280 by electrostatic motors 223 and 281. In each of the data cells 280, the zigzag track pattern is formed as shown in FIG. 39(C). The circuit unit 232 is provided with a data cell identifying circuit 285 for identifying a data cell to be accessed. Motor driving circuits 286 and 287 respectively drive the electrostatic motors 281 and 223 based on control signals supplied from the data cell identifying circuit 285.

The present invention is not limited to the aforementioned embodiments, and variation and modifications may be made without departing from the scope of the claimed invention.

What is claimed is:

1. A storage device comprising:

a substrate;

a magnetic storage medium provided on said substrate, information being magnetically stored in said magnetic storage medium;

a head unit;

a reciprocating mechanism provided on said substrate, said reciprocating mechanism causing said head unit to reciprocate in a plane parallel to a surface of said magnetic storage medium; and a locating mechanism provided on said substrate, said locating mechanism locating said head unit at a position on said magnetic storage medium, wherein, while said head unit located at the position on said magnetic storage medium is being moved by said reciprocating mechanism, information is recorded in or reproduced from said magnetic storage medium via said head unit, and wherein said reciprocating mechanism has a supporting member on which said head unit is mounted and a driving mechanism driving said supporting member so that said head unit is made to reciprocate, and wherein said locating mechanism has a rotating mechanism rotating said supporting member around a predetermined axis so that said head unit is located at a desired position on said magnetic storage medium; and wherein said rotating mechanism has a first power spring wound around the axis in a counterclockwise direction, a second power spring wound around the axis in a clockwise direction, and an electromagnetic driving motor rotating said supporting member around the axis, said supporting member being rotatably supported by said first and second power springs so that forces caused by said first and second power springs are applied around the axis.

2. A storage device as claimed in claim 1, wherein said electromagnetic driving motor has permanent magnets mounted on said supporting member and coils mounted on said substrate so that said permanent magnets and said coils face each other.

3. A storage device comprising:

a substrate;

a magnetic storage medium provided on said substrate, information being magnetically stored in said magnetic storage medium;

a head unit;

a reciprocating mechanism provided on said substrate, said reciprocating mechanism causing said head unit to reciprocate in a plane parallel to a surface of said magnetic storage medium; and a locating mechanism provided on said substrate, said locating mechanism locating said head unit at a position on said magnetic storage medium, wherein, while said head unit located at the position on said magnetic storage medium is being moved by said reciprocating mechanism, information is recorded in or reproduced from said magnetic storage medium via said head unit, and wherein said magnetic storage medium is a magnetic disk, and wherein said locating mechanism has a disk rotation mechanism rotating said magnetic disk step by step so that said head unit is located at a position on said recording disk;

wherein said reciprocating mechanism causes said head unit to reciprocate in a radial direction of said magnetic disk, so that, due to rotation of said magnetic disk and reciprocating motion of said head unit, first recording tracks are radially formed on said magnetic disk;

wherein said locating mechanism further comprises a moving mechanism moving said head unit in a predetermined direction step by step, so that, due to the moving of said head unit by said moving mechanism and the reciprocating motion of said head unit, second recording tracks are formed between adjacent first recording tracks on said magnetic disk.

4. A storage device comprising:

a substrate;

a magnetic storage medium provided on said substrate, information being magnetically stored in said magnetic storage medium;

a head unit;

a reciprocating mechanism provided on said substrate, said reciprocating mechanism causing said head unit to reciprocate in a plane parallel to a surface of said magnetic storage medium; and a locating mechanism provided on said substrate, said locating mechanism locating said head unit at a position on said magnetic storage medium, wherein, while said head unit located at the position on said magnetic storage medium is being moved by said reciprocating mechanism, information is recorded in or reproduced from said magnetic storage medium via said head unit, and wherein said magnetic storage medium is a magnetic disk, and wherein said locating mechanism has a disk rotation mechanism rotating said magnetic disk step by step so that said head unit is located at a position on said recording disk;

wherein said reciprocating mechanism causes said head unit to reciprocate in a radial direction of said magnetic disk, so that, due to rotation of said magnetic disk and reciprocating motion of said head unit, first recording tracks are radially formed on said magnetic disk;

wherein said locating mechanism further comprises a moving mechanism moving said head unit in a predetermined direction step by step, so that, due to the moving of said head unit by said moving mechanism and the reciprocating motion of said head unit, second recording tracks are formed between adjacent first recording tracks on said magnetic disk;

wherein each of said first recording tracks is longer than each of said second recording tracks.

5. A storage device comprising;

a substrate;

a magnetic storage medium provided on said substrate, information being magnetically stored in said magnetic storage medium;

a head unit;

a reciprocating mechanism provided on said substrate, said reciprocating mechanism causing said head unit to reciprocate in a plane parallel to a surface of said magnetic storage medium; and a locating mechanism provided on said substrate, said locating mechanism locating said head unit at a position on said magnetic storage medium, wherein, while said head unit located at the position on said magnetic storage medium is being moved by said reciprocating mechanism, information is recorded in or reproduced from said magnetic storage medium via said head unit, and wherein said magnetic storage medium is a magnetic disk, and wherein said locating mechanism has a disk rotation mechanism rotating said magnetic disk step by step so that said head unit is located at a position on said recording disk;

wherein said magnetic storage medium is provided with recording tracks radially formed thereon;

wherein said recording tracks include first tracks and second tracks formed between each two first tracks on a peripheral area of said magnetic disk;

wherein each of said first tracks is longer than each of said second tracks.

6. A storage device comprising:

a substrate;

a magnetic storage medium provided on said substrate, information being magnetically stored in said magnetic storage medium;

a head unit;

a reciprocating mechanism provided on said substrate, said reciprocating mechanism causing said head unit to reciprocate in a plane parallel to a surface of said magnetic storage medium; and a locating mechanism provided on said substrate, said locating mechanism locating said head unit at a position on said magnetic storage medium, wherein, while said head unit located at the position on said magnetic storage medium is being moved by said reciprocating mechanism, information is recorded in or reproduced from said magnetic storage medium via said head unit, and wherein said reciprocating mechanism has a supporting member on which said head unit is mounted and a driving mechanism driving said supporting member so that said head unit is made to reciprocate, and wherein said locating mechanism has a rotating mechanism rotating said supporting member around a predetermined axis in a direction substantially perpendicular to directions in which said head unit is caused to reciprocate so that said head unit is located to reciprocate at a desired position on said magnetic storage medium.

7. A storage device comprising:

a substrate;

a magnetic storage medium provided on said substrate, information being magnetically stored in said magnetic storage medium, said magnetic storage medium having a plurality of data cells which are formed so as to be radially arranged about an axis of said magnetic storage medium, each of said plurality of data cells being an area in which information is stored;

a head unit;

a locating mechanism provided on said substrate, said locating mechanism locating said head unit at a desired radial and peripheral position on a data cell of said magnetic storage medium; and a reciprocating mechanism provided on said substrate, said reciprocating mechanism causing said head unit to reciprocate in a plane parallel to a surface of said magnetic storage medium in directions substantially parallel to a direction from an area of said magnetic storage medium adjacent said axis toward a circumference of said medium, wherein, while said head unit located at said desired position on the data cell of said magnetic storage medium is being moved by said reciprocating mechanism, information is recorded in or reproduced from said magnetic storage medium via said head unit.

8. A storage device as claimed in claim 7, wherein said magnetic storage medium is a magnetic disk, and wherein, as a radial distance from a center of the disk increases, a number of data cells provided in an annular path at said distance increases.

9. A storage device comprising:

a substrate;

a disk-shaped magnetic storage medium provided on said substrate, information being magnetically stored in a radial path on said magnetic storage medium;

a head unit;

a reciprocating mechanism provided on said substrate, said reciprocating mechanism causing said head unit to reciprocate in an arcuate radial path in a plane parallel to a surface of said magnetic storage medium; and a locating mechanism provided on said substrate, said locating mechanism locating said head unit at a position on said magnetic storage medium, wherein, while said head unit located at the position on said magnetic storage medium is being moved by said reciprocating mechanism, information is recorded in or reproduced from said magnetic storage medium along said arcuate radial path thereon via said head unit, and wherein said reciprocating mechanism has a supporting member on which said head unit is mounted and a driving mechanism driving said supporting member so that said head unit is made to reciprocate arcuately, and wherein said locating mechanism has a rotating mechanism rotating said supporting member around a predetermined axis so that said head unit is located to reciprocate radially at a desired circumferential position on said magnetic storage medium.

10. A storage device comprising:

a substrate;

a disk shaped magnetic storage medium provided on said substrate, information being magnetically stored in said magnetic storage medium;

a head unit;

a reciprocating mechanism provided on said substrate, said reciprocating mechanism causing said head-unit to reciprocate in a radial path in a plane parallel to a surface of said magnetic storage medium in directions from a central axis to a periphery thereof;

a first locating mechanism provided on said substrate for moving said head unit to be positioned at a selected one of a plurality of radial positions relative to said central axis; and a second locating mechanism provided on said substrate, said second locating mechanism operating to rotate said disk for locating said head unit at a selected one of a plurality of circumferential positions on said magnetic storage medium, and for step-wise rotating said magnetic storage medium thereat, wherein, while said head unit is located at said selected radial position and said selected circumferential position on said magnetic storage medium and is being moved in a radial path by said reciprocating mechanism, information is recorded in or reproduced from said magnetic storage medium via said head unit along said radial path, such that a plurality of data cells are formed on said magnetic storage medium so as to be circumferentially and radially arranged thereon, each of said data cells being an area in which information is to be stored, and wherein said locating mechanism locates said head unit at a desired step-wise position on a selected one of said data cells.

11. A storage device comprising:

a substrate;

a magnetic storage medium provided on said substrate, information being magnetically stored in said magnetic storage medium;

a head unit;

a reciprocating mechanism provided on said substrate, said reciprocating mechanism causing said head unit to reciprocate in a plane parallel to a surface of said magnetic storage medium; and a locating mechanism provided on said substrate, said locating mechanism locating said head unit at a position on said magnetic storage medium, wherein, while said head unit located at the position on said magnetic storage medium is being moved by said reciprocating mechanism, information is recorded in or reproduced from said magnetic storage medium via said head unit, and wherein said magnetic storage medium is a magnetic disk, and wherein said locating mechanism has a disk rotation mechanism rotating said magnetic disk step by step so that said head unit is located at a position on said recording disk;

wherein said reciprocating mechanism causes said head unit to reciprocate in an arcuate radial direction on said surface of said magnetic disk so that, due to rotation of said magnetic disk and reciprocating motion of said head unit, recording tracks are formed radially in an arcuate path on said disk.

* * * * *